US010142833B2

(12) United States Patent
Coulier

(10) Patent No.: US 10,142,833 B2
(45) Date of Patent: Nov. 27, 2018

(54) METHODS, SYSTEMS AND APPARATUS FOR RECOGNIZING GENUINE PRODUCTS

(71) Applicant: VASCO DATA SECURITY, INC., Oakbrook Terrace, IL (US)

(72) Inventor: Frank Coulier, Grimbergen (BE)

(73) Assignee: OneSpan North America Inc., Chicago, IL (US)

( * ) Notice: Subject to any disclaimer, the term of this patent is extended or adjusted under 35 U.S.C. 154(b) by 192 days.

(21) Appl. No.: 14/984,225

(22) Filed: Dec. 30, 2015

(65) Prior Publication Data

US 2016/0192188 A1 Jun. 30, 2016

Related U.S. Application Data

(60) Provisional application No. 62/098,472, filed on Dec. 31, 2014.

(51) Int. Cl.
| | |
|---|---|
| *H04K 1/00* | (2006.01) |
| *H04W 12/04* | (2009.01) |
| *H04B 5/00* | (2006.01) |
| *H04L 9/14* | (2006.01) |
| *H04L 9/32* | (2006.01) |
| *H04L 29/06* | (2006.01) |
| *H04W 12/06* | (2009.01) |

(52) U.S. Cl.
CPC .......... *H04W 12/04* (2013.01); *H04B 5/0056* (2013.01); *H04L 9/14* (2013.01); *H04L 9/32* (2013.01); *H04L 63/0823* (2013.01); *H04L 2209/24* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 7,840,803 B2* | 11/2010 | Clarke | ................... | G06F 21/31 |
| | | | | 257/E23.179 |
| 9,798,294 B2* | 10/2017 | Markel | .................... | G05B 1/00 |
| 2005/0049979 A1* | 3/2005 | Collins | ................. | G06K 17/00 |
| | | | | 705/75 |
| 2006/0143695 A1* | 6/2006 | Grynberg | ............ | H04L 63/0407 |
| | | | | 726/4 |
| 2006/0230276 A1* | 10/2006 | Nochta | ..................... | G07F 7/08 |
| | | | | 713/176 |
| 2006/0235805 A1 | 10/2006 | Peng et al. | | |
| 2007/0057768 A1 | 3/2007 | Zeng et al. | | |
| 2009/0196423 A1* | 8/2009 | Chandrasekaran | ... | H04L 9/0891 |
| | | | | 380/277 |
| 2014/0201094 A1* | 7/2014 | Herrington | .......... | G06Q 30/018 |
| | | | | 705/317 |

(Continued)

FOREIGN PATENT DOCUMENTS

CN 102 955 958 3/2013

OTHER PUBLICATIONS

International Search Report and Written Opinion for PCT/US2015/068000 dated Apr. 12, 2016.

(Continued)

*Primary Examiner* — Lynn D Feild
*Assistant Examiner* — Vadim Savenkov
(74) *Attorney, Agent, or Firm* — RatnerPrestia

(57) ABSTRACT

Methods, apparatus and systems are described for identifying potentially counterfeited products or goods.

11 Claims, 7 Drawing Sheets

(56) References Cited

U.S. PATENT DOCUMENTS

| | | | |
|---|---|---|---|
| 2015/0134552 A1* | 5/2015 | Engels | G06Q 30/0185 |
| | | | 705/318 |
| 2015/0156184 A1* | 6/2015 | Tucker | H04L 63/0876 |
| | | | 713/168 |
| 2015/0188712 A1* | 7/2015 | Teuwen | G06K 7/10267 |
| | | | 713/176 |

OTHER PUBLICATIONS

A. Juels, "RFID security and privacy: a research survey," IEEE Journal on Selected Areas in Communications, vol. 24, No. 2, Feb. 2006, pp. 381-394, XP55217348.

* cited by examiner

METHODS, SYSTEMS AND APPARATUS FOR RECOGNIZING GENUINE PRODUCTS

CROSS REFERENCE TO RELATED APPLICATIONS

This application claims priority to U.S. Provisional application Ser. No. 62/098,472 entitled METHODS, SYSTEMS AND APPARATUS FOR RECOGNIZING GENUINE PRODUCTS, filed on Dec. 31, 2014, the contents of which are incorporated fully herein by reference.

FIELD OF THE INVENTION

The invention relates to methods, systems and apparatus for recognizing potentially counterfeited products or goods. More specifically, the invention relates to methods, systems and apparatus for confirming that the presence of a specific characteristic of a given physical product is legitimate.

BACKGROUND OF THE INVENTION

The principle behind trademarks is that trademarks are signs that are affixed to goods or services that indicate to prospective customers the origin of the goods or services. That way, prospective customers can identify goods and services as coming from a particular origin that they trust and they can distinguish these goods and services from similar goods or services coming from another origin that they don't necessarily trust.

Some trademarks enjoy a very high degree of trust among customers such that goods labeled with these trademarks can be sold at a significant margin. As a result, trademark fraud, whereby counterfeited goods are being sold with falsely affixed trademarks, is very widespread to the detriment of both the genuine trademark holders and the customers. In some cases, for example pharmaceuticals, the consequences of trademark fraud can even endanger the health and lives of customers. To combat this type of fraud, for example, a country's customs agency may try to intercept the importation of fraudulently marked goods at the border. This requires that customs are able to quickly and reliably distinguish genuinely marked goods from fraudulently marked counterfeit goods. With current technology, fraudulently copying physical trademark signs has in many cases become very easy, so that in many cases distinguishing counterfeited copies of trademarked goods from the genuine originals can be very challenging. Also, given the large numbers of (registered) intellectual property rights, in particular the large numbers of (registered) trademarks, in many jurisdictions, it is in practice infeasible for any customs officer to be aware of all existing intellectual property rights and know the particulars of all these existing intellectual property rights.

What is therefore needed is a technical solution for assisting, for example a customs agency, in assessing whether or not goods are fraudulent or counterfeit.

DISCLOSURE OF THE INVENTION

Affixing a Digital Intellectual Property (IP) Sign to a Physical Product.

In some embodiments a digital IP sign that can be read by an electronic reading device may be affixed to a physical product. In some embodiments this digital IP sign may be affixed to the physical product in addition to a physical sign such as, for example, a traditional visual trademark sign (such as a logo or a word mark), or in addition to another aspect or characteristic of the product that may be protected by an intellectual property right such as the design of the product, which may be protected by an industrial design right. Other examples of intellectual property rights that may correspond to visually perceptible features or characteristics of a product may comprise collective trademarks, certification marks and geographic indication marks.

Capturing an Actual Characteristic of the Physical Product.

In some embodiments one or more actual characteristics of the physical product, such as the shape of the physical product or a visual mark attached to the product, may be captured, for example during an inspection at customs of the physical product. In some embodiments the electronic reading device may be adapted to capture one or more actual characteristics of the physical product. For example in some embodiments the electronic reading device may comprise a digital camera to take a photo of the physical product or a part of the physical product, for example a part of a surface of the physical product that may present a sign that may comprise a visual sign such as a trademark. In some embodiments the electronic reading device, or a system comprising or cooperating with the electronic reading device, may be adapted to recognize and/or extract one or more actual characteristics of the physical product from a picture, which may have been taken with a digital camera comprised in the electronic reading device. In some embodiments the electronic reading device, or a system comprising or cooperating with the electronic reading device, may be adapted to recognize and extract text and words, which may comprise a word mark, from a picture, which may have been taken with a digital camera comprised in the electronic reading device. In some embodiments the electronic reading device may be adapted to interact with a human operator, such as for example a customs officer. In some embodiments the electronic reading device may be adapted to receive guidance or instructions of the human operator for obtaining actual characteristics of the physical product. For example the human operator may point the electronic reading device to an area of the product that may present a sign that may look to the human operator like a visual trademark sign. In some embodiments the electronic reading device may comprise a human input interface adapted for the human operator to enter a word or text that, for example, the human operator may have seen on a product and may have interpreted as perhaps being a trademark.

Reading a Digital IP Sign Affixed to a Physical Product.

In some embodiments the electronic reading device may, for example during an inspection at customs of the physical product, read one or more digital IP signs affixed to the physical product. In some embodiments the electronic reading device may read the digital IP sign from an electronic device (henceforth referred to as an electronic IP tag) that may be affixed to or embedded in the physical product.

In some embodiments the electronic IP tag and the electronic reading device may be adapted to communicate using a wireless data communication interface, for example to transfer a digital IP sign or data related to such a digital IP sign from the electronic IP tag to the electronic reading device. In some embodiments the electronic IP tag and the electronic reading device may both comprise a wireless data communication interface which may be adapted for short range wireless communication. In some embodiments the electronic IP tag may for example comprise a contactless smart card and the electronic reading device may for example comprise a contactless smart card reader. In some embodiments the electronic IP tag and the electronic reading device may for example support NFC (Near Field Communication).

Obtaining a Reference Representation of an IP Right Associated with a Digital IP Sign.

In some embodiments a specific IP right may be associated with the digital IP sign. In some embodiments also a reference representation (which may consist of a set of representations) of that specific IP right may be associated with the digital IP sign. In some embodiments a digital IP sign may comprise sufficient data for the electronic reading device, or a system comprising or cooperating with the electronic reading device, to identify an IP right associated with the digital IP sign and/or to obtain data related to an IP right associated with the digital IP sign such as a reference representation of an IP right associated with the digital IP sign. The reference representation may for example comprise a representation of a product design or of a physical mark (e.g., a trademark) as may be officially registered at the trademark or design registration office. For example in some embodiments the reference representation may comprise an alphanumerical representation of a word mark that may have been registered at an official trademark office, or the reference representation may comprise a picture of a logo that may have been registered at an official IP office such as a trademark office. In some embodiments the digital IP sign may contain the reference representation itself. In some embodiments the digital IP sign may contain a pointer, such as a URL (Uniform Resource Locator) or the registration number of a traditional registration such as a trademark or design registration, that may be used, for example by the electronic reading device or by a system comprising or cooperating with the electronic reading device, to retrieve the reference representation from, for example, a database containing reference representations such as an official database of registered trademarks or designs.

Authenticating a Digital IP Sign.

In some embodiments only the legitimate holder of a particular registered IP right such as a trademark or a registered industrial design may be able to generate valid digital IP signs that refer to that particular registered IP right. In some embodiments it may be difficult for the digital IP sign to be copied. In some embodiments the digital IP sign may be adapted such that it can be electronically authenticated. In some embodiments it may be possible for the electronic reading device, or a system comprising or cooperating with the electronic reading device, to authenticate the digital IP sign. In some embodiments an electronic IP tag may be affixed to or embedded in the physical product and the electronic IP tag may be adapted to engage with an electronic reading device in a digital IP sign authentication protocol whereby the electronic reading device may be adapted to read and authenticate the digital IP sign. In some embodiments the digital IP sign authentication protocol may be based on cryptographic mechanisms. In some embodiments the digital IP sign authentication protocol may comprise the electronic reading device submitting a challenge to the electronic IP tag and the electronic IP tag may be adapted to calculate a response to this challenge and return the response to the electronic reading device and the electronic reading device may be adapted to verify the response that it may receive from the electronic IP tag.

In some embodiments the digital IP sign authentication protocol may be based on cryptography whereby some cryptographic secret may be securely stored in the electronic IP tag. The digital IP sign authentication protocol may for example be based on asymmetric cryptography whereby the digital IP sign may comprise, or may be associated with and may refer to, a digital IP sign public key (of a public/private key pair) and whereby the digital IP sign may also comprise, or may be associated with and may refer to, a digital IP sign certificate whereby the digital IP sign certificate may contain the data that the electronic reading device may use to identify an IP right associated with the digital IP sign and/or to obtain a reference representation of such an IP right associated with the digital IP sign. The digital IP sign certificate may be part of a certificate chain with a root certificate generated by and/or corresponding to a trusted entity. For example the root certificate may be generated by or correspond to an entity trusted by customs (such as for example an official Trademark Office or Customs itself). In some embodiments the digital IP sign may comprise data that may allow an electronic reading device to obtain the aforementioned digital IP sign public key and/or digital IP sign certificate and/or certificate chain of the digital IP sign. For example in some embodiments the digital IP sign may comprise a reference data element, such as a serial number or a url (uniform resource locator), that may be used by an electronic reading device, or a system comprising or cooperating with the electronic reading device, to obtain the aforementioned digital IP sign public key and/or digital IP sign certificate and/or certificate chain, e.g. by using the reference data element as an index in a database or as a url to access a server. In some embodiments an electronic IP tag may comprise a digital IP sign private key corresponding to the aforementioned digital IP sign public key of the digital IP sign. In some embodiments the electronic IP tag and the electronic reading device may be adapted to perform a challenge-response protocol to authenticate the digital IP sign (whereby the challenge-response protocol may be based on standard Public Key Infrastructure (PKI) based authentication protocols).

For example in some embodiments authenticating a digital IP sign of an electronic IP tag may comprise the following steps. The electronic reading device, or a system comprising or cooperating with the electronic reading device, may be adapted to generate a (random) challenge and to transfer the challenge to the electronic IP tag. The electronic IP tag may be adapted to receive the challenge and generate an electronic signature over the received challenge using a digital signature algorithm, which may be based on an asymmetric cryptographic algorithm such as the Rivest-Shamir-Adleman (RSA) algorithm or the Digital Signal Algorithm (DSA), parameterized with a secret cryptographic signature key comprised in the electronic IP tag, such as the aforementioned digital IP sign private key. The electronic IP tag may be further adapted to return the generated electronic signature to the electronic reading device, or the system comprising or cooperating with the electronic reading device. The electronic reading device, or the system comprising or cooperating with the electronic reading device, may be adapted to receive the electronic signature generated by the electronic IP tag and may be further adapted to verify the received electronic signature. The electronic reading device, or the system comprising or cooperating with the electronic reading device, may be adapted to verify the received electronic signature by using a signature verification algorithm, which may be based on an asymmetric cryptographic algorithm, that matches the signature generation algorithm used by the electronic IP tag and that may be parameterized by the aforementioned digital IP sign public key associated with the digital IP sign. The electronic reading device, or the system comprising or cooperating with the electronic reading device, may be further adapted to also verify the aforementioned digital IP sign certificate and/or certificate chain.

In some embodiments authenticating the digital IP sign may also comprise authenticating the aforementioned data comprised in the digital IP sign which the electronic reading device, or a system comprising or cooperating with the electronic reading device, may read and may use to identify an IP right associated with the digital IP sign and/or to obtain data related to an IP right associated with the digital IP sign such as a reference representation of an IP right associated with the digital IP sign. For example in some embodiments this data may be comprised in the digital IP sign certificate and/or the certificate chain of the digital IP sign.

Certifying Digital IP Signs.

In some embodiments a holder or proprietor of, for example, an IP right such as a trademark or industrial design right may—for example as part of the registration process of the trademark or industrial design—submit to an official trademark or design registration office a public key of a public-private key pair that is to be associated with the IP right (e.g. trademark or industrial design) that is registered. The trademark or design registration office may then generate a digital IP certificate (e.g., a digital trademark certificate) for the public key, that links the public key to the registered trademark or design. In some embodiments the generated certificate may link the public key also to information that contains sufficient data to identify the IP right and/or to retrieve a reference representation of, for example, the registered IP right (e.g. a trademark or industrial design). For the purpose of generating such digital trademark certificates, the trademark or design registration office may operate a trusted CA (Certificate Authority). In some embodiments a manufacturer, such as the holder or proprietor of the IP right (e.g. a trademark or industrial design), may then attach electronic IP tags to goods or products that, for example, may be branded with a physical trademark sign that corresponds to the registered trademark or that may have a design that corresponds to the registered industrial design. These electronic IP tags may contain the private key of the public-private key pair of the public key contained in the digital trademark certificate. In some embodiments the electronic IP tags may also comprise the digital trademark certificate.

Alternatively, in some embodiments the public key that is certified by, for example, the trademark or design registration office, may be a (trademark) root public key of a trademark root public-private key pair that is associated with a specific IP right and each individual electronic IP tag comprising a digital IP sign associated with that specific IP right may be associated with a different unique tag-specific private-public key pair that may be certified in turn by the holder or proprietor of the (trademark) root public-private key pair associated with that specific IP right using the (trademark) root private key of the (trademark) root public-private key pair associated with that specific IP right and certified by, for example, the trademark or design registration office. In some embodiments the tag-specific private-public key pair may be directly certified with the (trademark) root public-private key pair associated with that specific IP right, i.e. the certificate of the tag-specific private-public key pair may be generated with the (trademark) root private key associated with that specific IP right. In some embodiments the tag-specific private-public key pair may be indirectly certified with the (trademark) root public-private key pair associated with that specific IP right, i.e. the certificate of the tag-specific private-public key pair may not be generated with the (trademark) root private key associated with that specific IP right, but the certificate of the tag-specific private-public key pair may be part of a certificate chain of which the certificate of the (trademark) root private-public key pair associated with that specific IP right may be a root, or the certificate of the tag-specific private-public key pair may be at the end of a certificate chain that leads up to the (trademark) root public key associated with that specific IP right.

In some embodiments the digital IP sign and the electronic reading device or a system comprising or cooperating with the electronic reading device may also be adapted to authenticate additional data comprised in the digital IP sign. This additional data may be associated with the digital IP sign or with an intellectual property right that is associated with the digital IP sign. For example this additional data may comprise data identifying an intellectual property right that is associated with the digital IP sign and/or data that may be used to identify an IP right associated with the digital IP sign and/or a reference representation of an IP right associated with the digital IP sign and/or data that may be used to obtain data related to an IP right associated with the digital IP sign such as a reference representation of an IP right associated with the digital IP sign. In some embodiments the additional data may be comprised in a certificate associated with the digital IP sign which may be comprised in the digital IP sign and which may be read and verified by the electronic reading device or a system comprising or cooperating with the electronic reading device. In some embodiments the digital IP sign may be adapted to sign the additional data, e.g. as part of a protocol to authenticate the digital IP sign, and the electronic reading device or a system comprising or cooperating with the electronic reading device may be adapted to obtain and verify this signature.

Detecting Possible IP Infringement.

Capturing actual characteristics of a product that potentially could correspond to intellectual property rights.

In some embodiments the electronic reading device or a system comprising or cooperating with the electronic reading device, may be adapted to obtain one or more actual (physical) characteristics of a product, such as for example a trademark or logo that has been visibly applied to the product, that could potentially correspond to one or more (registered or non-registered) intellectual property rights. These actual physical product characteristics may elsewhere in this description also be referred to as product features. For example in some embodiments the electronic reading device may be adapted to capture a picture of the product and the electronic reading device or a system comprising or cooperating with the electronic reading device may be adapted to extract from the captured picture an actual characteristic of the product that may correspond to one or more (registered or non-registered) intellectual property rights. For example the electronic reading device or a system comprising or cooperating with the electronic reading device may be adapted to extract words or text or logos (that may be visibly present on the product) from a picture of the product, and the extracted words, text or logos may be treated as potential trademarks that may have been applied, legitimately or illegitimately, to the product. In some embodiments the electronic reading device or a system comprising or cooperating with the electronic reading device may be adapted to search for symbols like ® or ™ to identify and capture actual characteristics that may be potential trademarks.

Identifying Possibly Infringing Captured Product Characteristics.

In some embodiments the electronic reading device or a system comprising or cooperating with the electronic reading device, may be adapted to identify captured product characteristics that may potentially be infringing some intellectual property right. In some embodiments the electronic reading device or a system comprising or cooperating with the electronic reading device, may also be adapted to estimate the likelihood or probability that any given captured product characteristic is potentially infringing some (identified or non-identified) intellectual property right. Such an estimated probability or likelihood that a given captured product characteristic may possibly be infringing some intellectual property right may be referred to as the 'product characteristic general infringement potential' of that given captured product characteristic. In some embodiments the possibly infringing captured product characteristics may be determined as those captured product characteristics that have an (estimated) product characteristic general infringement potential that exceeds a certain threshold value.

In some embodiments any captured product characteristic may be considered by default as potentially infringing some (non-identified) intellectual property right. In some embodiments a default value may be given as an estimate for the product characteristic general infringement potential of any captured product characteristic. This has the advantage that the electronic reading device or a system comprising or cooperating with the electronic reading device doesn't need access to a database of existing or registered intellectual property rights in order to estimate the product characteristic general infringement potential of any captured product characteristic.

Identifying Possibly Infringed Intellectual Property Rights.

In other embodiments identifying possibly infringing captured product characteristics and/or estimating the product characteristic general infringement potential of any captured product characteristics of the product, may be linked to identifying the particular intellectual property rights that may potentially be infringed by these possibly infringing captured product characteristics.

In some embodiments the electronic reading device or a system comprising or cooperating with the electronic reading device, may be adapted to verify to what extent a captured product characteristic of the product may match with one or more registered intellectual property rights. For example in some embodiments, the electronic reading device or a system comprising or cooperating with the electronic reading device, may be adapted to verify to what extent a potential trademark (which may be extracted from a captured picture of the product as explained elsewhere in this application) such as a word or logo, may match one or more registered trademarks, i.e. to what extent the captured potential trademark may be identical or similar to the one or more registered trademarks i.e. what the degree of similarity is between the captured potential trademark and the one or more registered trademarks. In some embodiments the extent a captured product characteristic of the product may match with one or more registered intellectual property rights, i.e. the degree of correspondence between the captured product characteristic and one or more registered intellectual property rights, may be assessed by determining a degree of similarity between an image of the product characteristic (that may have been captured by the electronic reading device) and one or more reference representations of the one or more registered intellectual property rights.

For example, in some embodiments a captured product characteristic may be compared to one or more registered word trademarks. The electronic reading device, or a component of a system comprising or cooperating with the electronic reading device, may for example be adapted to: capture an image from the product, e.g. by using a digital camera comprised in the electronic reading device; attempt to extract from an image of the product a piece of text, e.g. by applying optical character recognition algorithms to the captured image; and, if a piece of text has been extracted from the captured image, retrieve one or more reference texts of one or more registered word trademarks e.g. by accessing a database of registered trademarks, and compare the extracted piece of text to the one or more reference texts to assess the degree of similarity between the extracted piece of text and any of the one or more reference texts; whereby the extracted piece of text may be a captured potential trademark and the degree of similarity between the extracted piece of text and one of the one or more reference texts may represent or may be taken as the degree of similarity between the captured potential trademark and the registered word mark that said one of the one or more reference texts corresponds to. For comparing the extracted piece of text to a reference text, a standard algorithm for comparing texts or words may be used. The degree of similarity may be expressed for example as a percentage. For example if the extracted piece of text and the reference text are identical (which may for example be defined as the extracted piece of text and the reference text having the same number of characters with identical characters in identical positions) then the degree of similarity may be defined as 100%. If on the other hand the extracted piece of text and the reference text have nothing in common (e.g.: they have a different number of characters, they don't have a single character in common, one doesn't have a single character or group of characters that visually or phonetically resembles a character or group of characters of the other), then the degree of similarity may be defined as 100%. Factors that may influence the degree of similarity may include for example: the presence or absence of identical parts of text in identical parts of the extracted piece of text and the reference text, the length of any identical parts, the position in the texts of identical and/or non-identical whether non-identical characters or groups of characters may nevertheless be visually or phonetically be similar; for example the letters 'I' and 'l' may be deemed to be visually similar, whereas the letters 'v' and 'f', especially at the end of a word, may be deemed phonetically similar. In some embodiments these factors may be combined, for example by using heuristic rules, to determine the degree of similarity.

Similarly, in some embodiments a captured product characteristic may be compared to one or more registered figure or device trademarks. The electronic reading device, or a component of a system comprising or cooperating with the electronic reading device, may for example be adapted to: capture an image from the product, e.g. by using a digital camera comprised in the electronic reading device; retrieve one or more reference images representing one or more registered word trademarks e.g. by accessing a database of registered trademarks, and compare the captured image to the one or more reference images to assess the degree of similarity. For comparing the captured image to the one or more reference images, image processing and recognition algorithms may be used.

In some embodiments, when assessing the degree of similarity or correspondence between an image of a product characteristic and one or more reference representations of one or more registered intellectual property rights—or more generally, between the captured product characteristic and the one or more registered intellectual property rights—heuristic rules, artificial intelligence systems and/or trained neural networks may be used.

In some embodiments the electronic reading device or a system comprising or cooperating with the electronic reading device may be adapted to determine a set of registered intellectual property rights, and may be further adapted to compare one or more or all of the captured product characteristics of the product with the registered intellectual property rights of such a set to verify whether or to what extent these captured product characteristics match one or more of the registered intellectual property rights of that set. In some embodiments determining such a set may be an implicit step. In some embodiments the electronic reading device or a system comprising or cooperating with the electronic reading device may be adapted to determine such a set by accessing a database of registered intellectual property rights, and for example include in the set some or all the registered intellectual property rights of the database. Such a database may comprise a database of an official intellectual property registration agency or office such as for example a national or regional trademark or industrial design registration office or agency. In some embodiments the electronic reading device or a system comprising or cooperating with the electronic reading device may be adapted to apply some criteria to candidate intellectual property rights to decide whether to include or exclude these candidate intellectual property rights in or from such a set. For example, in some embodiments the electronic reading device or a system comprising or cooperating with the electronic reading device may be adapted to exclude from such a set one or more or all of the intellectual property rights that correspond to intellectual property rights associated with an authenticated digital IP sign comprised in the product. In some embodiments the electronic reading device or a system comprising or cooperating with the electronic reading device may be adapted to classify intellectual property rights into a number of intellectual property right classes such as for example 'word marks', 'figurative marks', 'designs', to also classify captured product characteristics into similar classes and to include in such a set only intellectual property rights belonging to a class that matches a class into which has been classified at least one of the captured product characteristics that will be compared to the intellectual property rights of that set. For example, in some embodiments a captured product characteristic may consist of a text and the electronic reading device or a system comprising or cooperating with the electronic reading device may be adapted to determine a set of intellectual property rights to compare to the captured text whereby only registered trademarks having a verbal element with a textual representation are included in the set. In some embodiments the electronic reading device or a system comprising or cooperating with the electronic reading device, may be adapted to access a database of registered intellectual property rights to identify registered intellectual property rights that may match, at least to some extent, a captured actual characteristic of the product.

In some embodiments the electronic reading device or a system comprising or cooperating with the electronic reading device, may be adapted to compare a captured actual characteristic to the reference representations of the intellectual property rights in a set of registered intellectual property rights. The electronic reading device or a system comprising or cooperating with the electronic reading device, may be adapted to obtain these reference representations for example by accessing the above mentioned database of registered intellectual property rights. For example in some embodiments the electronic reading device or a system comprising or cooperating with the electronic reading device may be adapted to extract words or text from a picture of the product and compare the extracted words or text with the texts of a plurality of registered trademarks.

For each individual intellectual property right of a set of registered intellectual property rights determined as explained above, the electronic reading device, or a system comprising or cooperating with the electronic reading device, may determine the degree of correspondence or similarity between a particular captured product characteristic and a reference representation of that individual intellectual property right (IPR), and may assign a score reflecting this degree of correspondence or similarity. Examples of how a degree of correspondence or similarity may be assessed can be found elsewhere in this description. This score may be referred to as the 'specific IPR similarity score' of that particular captured product characteristic for that individual intellectual property right. In some embodiments this specific IPR similarity score may be used as an estimate of the likelihood or probability that the particular captured product characteristic is infringing the particular intellectual property right that the reference representation is associated with. In some embodiments determining the specific IPR similarity score for a given intellectual property right and for any captured product characteristic may also take into account a sensitivity parameter which may be a function of the intellectual property right being considered. For example with each intellectual property right a parameter may be associated which has the effect that if the value of this parameter is increased then also the determined value of the specific IPR similarity score will tend to be higher; and vice versa, if the value of this parameter is decreased then also the determined value of the specific IPR similarity score will tend to be lower. This allows to make the system more or less sensitive to possible infringement of certain selected intellectual property rights.

In some embodiments, the electronic reading device or a system comprising or cooperating with the electronic reading device, may consider any captured product characteristic for which the correspondence or similarity (as may be reflected in the specific IPR similarity score as explained above) with a reference representation of some individual intellectual property right of a set of registered intellectual property rights exceeds a certain threshold, as a potentially infringing product characteristic. This threshold may be a function of the type of intellectual property right. For example the threshold may be different for word marks than for figurative marks and may still be different for registered designs.

In some embodiments the electronic reading device or a system comprising or cooperating with the electronic reading device, may consider all registered intellectual property rights for which the degree of correspondence with at least one of the particular actual product characteristics of the product exceeds a certain threshold, as potentially infringed intellectual property rights. In some embodiments the electronic reading device or a system comprising or cooperating with the electronic reading device, may consider all registered intellectual property rights for which at least one of the particular actual product characteristics of the product has a specific IPR similarity score that exceeds a certain threshold, as potentially infringed intellectual property rights.

In some embodiments the electronic reading device, or a system comprising or cooperating with the electronic reading device, may be adapted to determine an estimate for the product characteristic general infringement potential of a particular captured product characteristic by using all the specific IPR similarity scores that have been determined for that particular captured product characteristic for the intellectual property rights of a certain set of intellectual property rights (as explained in more detail elsewhere in this description). In some embodiments any intellectual property right associated with an (authenticated) digital IP sign comprised in the product may have been excluded from this set. For example in some embodiments the product characteristic general infringement potential may be calculated as a function of all these specific IPR similarity scores. For example the value for the product characteristic general infringement potential may be selected as the maximum value among all these specific IPR similarity scores.

Identifying Possibly Non-Infringing Captured Product Characteristics.

In some embodiments the electronic reading device or a system comprising or cooperating with the electronic reading device, may be adapted to determine the likelihood that a captured product characteristic corresponds to an authorized use of an intellectual property right. In some embodiments the electronic reading device or a system comprising or cooperating with the electronic reading device, may be adapted to determine or estimate the likelihood or probability that a captured product characteristic corresponds to an authorized use of an intellectual property right associated with an (authenticated) digital IP sign comprised in the product. This estimated likelihood or probability that a given captured product characteristic corresponds to an authorized use of any of the intellectual property rights associated with any of the (authenticated) digital IP signs comprised in the product, may be referred to as the 'product characteristic general authorization probability' for that given captured product characteristic.

Comparing the Actual Product Characteristics with the Digital IP Sign.

In some embodiments the electronic reading device or a system comprising or cooperating with the electronic reading device, may be adapted to determine the degree of similarity or correspondence between a given captured product characteristic and a particular intellectual property right associated with a particular (authenticated) digital IP sign comprised in the product and may assign a score to the captured product characteristic that reflects this degree of correspondence or similarity. In some embodiments a reference representation of such an intellectual property right associated with a digital IP sign and obtained as described elsewhere in this application, may then be compared, for example by the electronic reading device or by a system comprising or cooperating with the electronic reading device, to the actual captured product characteristic of the physical product for determining such a score that reflects the degree of correspondence or similarity between that given captured product characteristic and that intellectual property right associated with the (authenticated) digital IP sign. In some embodiments this similarity score may be used as an estimate of the likelihood or probability that the captured product characteristic is an authorized use of that intellectual property right associated with the (authenticated) digital IP. Such an estimate of the likelihood or probability that a given captured product characteristic is actually an authorized use of a particular intellectual property right associated with an (authenticated) digital IP sign comprised in the product, may be referred to as the 'product characteristic specific authorization probability' of that given captured product characteristic for that particular intellectual property right associated with that digital IP sign.

For example in some embodiments such a reference representation may comprise a textual representation of for example a word mark. In some embodiments comparing a reference representation to for example an image of an actual characteristic of a physical product may comprise applying a text recognition and/or extraction algorithm, which may for example comprise an OCR (Optical Character Recognition) algorithm.

Examples of Determining the Similarity of a Captured Product Characteristic with a Reference Representation.

In some embodiments a reference representation may be related to a registered industrial product design. In some embodiments a reference representation may comprise a representation of an industrial product design. In some embodiments determining the degree of correspondence or similarity between a captured product characteristic and such a product design, may comprise comparing the captured product characteristic to a reference representation of the industrial product design. In some embodiments the captured product characteristic may comprise or may be extracted from one or more images of a physical product or a part of a physical product and comparing the captured product characteristic to a reference representation of the industrial product design may comprise comparing the reference presentation to these images. In some embodiments comparing a reference representation, that may for example be related to a registered product design, to for example one or more images of a physical product or a part of a physical product may comprise applying computer vision and/or machine vision technology such as for example object recognition and/or shape recognition technology.

In some embodiments comparing one or more actual characteristics of the physical product to a reference representation obtained by an electronic reading device reading a digital IP sign from an electronic IP tag that may be affixed to or embedded in the physical product may comprise the electronic reading device or a system comprising or cooperating with the electronic reading device presenting the reference representation to a human operator. In some embodiments the human operator may also be invited, e.g. by the electronic reading device or a system comprising or cooperating with the electronic reading device, to make and/or provide a judgment on whether the one or more actual characteristics match the presented reference representation.

In some embodiments the electronic reading device or a system comprising or cooperating with the electronic reading device, may be adapted to combine, for a given captured product characteristic, the product characteristic specific authorization probabilities of that given captured product characteristic for all intellectual property rights associated with any digital IP sign comprised in the product and to determine a product characteristic general authorization probability for that given captured product characteristic using all these product characteristic specific authorization probabilities. For example in some embodiments the electronic reading device or a system comprising or cooperating with the electronic reading device, may be adapted to determine the product characteristic general authorization probability for that given captured product characteristic by selecting the maximum value among all these product characteristic specific authorization probabilities.

Identifying the Product as (Possibly) Counterfeit.

For example, based on the outcome of the comparison of actual characteristics of the product with reference presentations of intellectual property rights associated with digital IP signs affixed to or embedded in the physical product, a decision may be made as to whether or not the physical product should be identified as potentially counterfeit. In some embodiments, if a particular actual characteristic of the physical product matches a reference representation corresponding to one of the one or more digital IP signs read by the electronic reading device, then this may be interpreted as a sign that the presence of that particular actual characteristic may be legitimate. If however a particular actual characteristic of the physical product doesn't match any of the reference representations corresponding to the one or more digital IP signs read by the electronic reading device, then in some embodiments this may be interpreted as a sign that the presence of that particular actual characteristic may not be legitimate, in other words, that the physical product may be a counterfeit; and the electronic reading device or a system comprising or cooperating with the electronic reading device may be adapted to identity the product as potentially counterfeit and/or alert a human operator to this condition, and/or for example invite the human operator to investigate the suspect particular actual characteristic in more detail.

In some embodiments the electronic reading device or a system comprising or cooperating with the electronic reading device, may be adapted to determine whether or not the product is (possibly) infringing some intellectual property right. In some embodiments the electronic reading device, or a system comprising or cooperating with the electronic reading device, may be adapted to determine that the product is (possibly) infringing some (identified or non-identified) intellectual property right if at least one captured product characteristic of the product has been identified as possibly infringing some (identified or non-identified) intellectual property right. In some embodiments, if no captured product characteristic of the product has been identified as possibly infringing some (identified or non-identified) intellectual property right then the product as a whole is not flagged as possible counterfeit.

Estimating the Product's Infringement Probability.

In some embodiments the electronic reading device or a system comprising or cooperating with the electronic reading device, may be adapted to estimate the probability that the product as a whole is infringing some (identified or non-identified) intellectual property right. In some embodiments the electronic reading device or a system comprising or cooperating with the electronic reading device, may be adapted to estimate for each individual captured product characteristic of the product an individual product characteristic general infringement probability i.e. the likelihood or probability that that individual captured product characteristic is infringing some (identified or non-identified) intellectual property right intellectual property right. In some embodiments the electronic reading device, or a system comprising or cooperating with the electronic reading device, may be adapted to estimate the overall probability that the product as a whole is infringing some (identified or non-identified) intellectual property right intellectual property right by combining the various individual product characteristic general infringement probabilities of one or more or all of the individual captured product characteristics of the product. For example, in some embodiments the overall probability that the product is infringing some (identified or non-identified) intellectual property right may be determined by selecting the maximum value among the various individual product characteristic general infringement probabilities of one or more or all of the individual captured product characteristics of the product.

Estimating an Individual Product Characteristic General Infringement Probability.

In some embodiments the electronic reading device, or a system comprising or cooperating with the electronic reading device, may be adapted to estimate for a given individual captured product characteristic an individual product characteristic general infringement probability by weighing the likelihood that this given captured product characteristic is or corresponds to an authorized use of an intellectual property right associated with an (authenticated) digital IP sign comprised in the product against the likelihood that this given captured product characteristic may be infringing some other intellectual property right. In some embodiments the electronic reading device, or a system comprising or cooperating with the electronic reading device, may be adapted to estimate for a given individual captured product characteristic an individual product characteristic general infringement probability by using, if available, on the one hand the product characteristic general infringement potential (as discussed in more detail elsewhere in this description) and/or one or more or all of the specific IPR similarity scores (or at least all the specific IPR similarity scores that exceed a certain threshold) of that given individual captured product characteristic and/or on the other hand the product characteristic general authorization probability and/or one or more or all of the product characteristic specific authorization probabilities of that given individual captured product characteristic.

For example, in some embodiments the product characteristic general infringement probability for a given captured product characteristic may be calculated as a function of the product characteristic general infringement potential and the product characteristic general authorization probability of that captured product characteristic. In some embodiments the function may be such that for a given value of the product characteristic general authorization probability, the calculated value of the product characteristic general infringement probability will be monotonically increasing as a function of the product characteristic general infringement potential. In some embodiments the function may be such that for a given value of the product characteristic general infringement potential, the calculated value of the product characteristic general infringement probability will be monotonically decreasing as a function of the product characteristic general authorization probability. For example, in some embodiments if the product characteristic general infringement potential is larger than the product characteristic general authorization probability, then the value of the product characteristic general infringement probability may be set to the value of the product characteristic general infringement potential, else the value of the product characteristic general infringement probability may be set to zero. In some embodiments the product characteristic general infringement probability may be calculated as an average (which may for example be an arithmetic, geometrical or harmonic mean) of the product characteristic general infringement potential and a complementary value of the product characteristic general authorization probability, wherein this complementary value may be given by the formula: (100%–the product characteristic general authorization probability) if probabilities are expressed in percentages.

For example, in some embodiments the product characteristic general infringement probability for a given captured product characteristic may be calculated as a function of all the specific IPR similarity scores determined for that given individual captured product characteristic and all the product characteristic specific authorization probabilities determined for that given individual captured product characteristic. For example in some embodiments the product characteristic general infringement probability may be determined as a function of the maximum value among all these specific IPR similarity scores and the maximum value among all these product characteristic specific authorization probabilities, whereby the specific IPR similarity scores for intellectual property rights associated with an (authenticated) digital IP sign may have been excluded. This function may be similar or identical to the function described above to determine the value of the product characteristic general infringement probability as a function of the product characteristic general infringement potential and the product characteristic general authorization probability of that captured product characteristic.

Tuning the Sensitivity.

In some embodiments various parameters and thresholds (such as the thresholds discussed elsewhere in this description) used by the electronic reading device or a system comprising or cooperating with the electronic reading device may be tunable such that the sensitivity of the system to possible infringement cases may be optimized as function of the circumstances. For example, if the workload of customs is exceeding the capacity of customs to do follow-up of all the products flagged by the system as suspect, then the parameters and thresholds may be tuned so that the system becomes less sensitive. Or, for example, if a certain (registered) intellectual property right appears to have become a particular 'popular' target for infringement attempts, then a parameter or threshold may be tuned to make the system particularly sensitive for potential infringement of this particular intellectual property right.

Informing a Human Operator.

In some embodiments the electronic reading device or a system comprising or cooperating with the electronic reading device may be adapted to inform a human operator, such as a Customs officer, whether or not the product is potentially infringing an intellectual property right.

In some embodiments the electronic reading device or a system comprising or cooperating with the electronic reading device may be adapted to give the human operator an estimate of the probability that the product is infringing some (identified or non-identified) intellectual property right. In some embodiments the electronic reading device or a system comprising or cooperating with the electronic reading device may be adapted to inform the human operator which actual product characteristic may be infringing an intellectual property right and may also give the human operator an indication of the (estimated) probability or likelihood of such infringement. In some embodiments the electronic reading device or a system comprising or cooperating with the electronic reading device may be adapted to inform the human operator which intellectual property rights may be infringed. In some embodiments the electronic reading device or a system comprising or cooperating with the electronic reading device may be adapted to inform the human operator which actual product characteristic may be infringing an intellectual property right and which intellectual property right that actual product characteristic may be infringing. In some embodiments the electronic reading device or a system comprising or cooperating with the electronic reading device may be adapted to give the human operator an indication of the (estimated) probability or likelihood that a particular actual product characteristic may be infringing a particular intellectual property right. In some embodiments the electronic reading device or a system comprising or cooperating with the electronic reading device may be adapted to present to the human operator a representation of an intellectual property right that may be infringed by the product or by a particular actual product characteristic of the product. The electronic reading device or a system comprising or cooperating with the electronic reading device may also be adapted to present to the human operator an indication of the (estimated) probability or likelihood of such infringement.

In some embodiments the electronic reading device or a system comprising or cooperating with the electronic reading device may be adapted to present to the human operator other information related to an intellectual property right that may be infringed by the product or by a particular actual product characteristic of the product. Such other information may include for example a description of the goods that the intellectual property right is normally associated with, or the import channels that are authorized for products associated with the intellectual property right, or information regarding conditions that may indicate counterfeited or infringing goods such as certain known sources or destinations of counterfeited or infringing goods, or contact information of the legitimate owner of the potentially infringed intellectual property rights.

In some embodiments the electronic reading device or a system comprising or cooperating with the electronic reading device may be adapted to give the human operator for each or at least for some of the captured actual product characteristics an indication of the (estimated) probability that that captured actual product characteristic is or corresponds to an authorized use of an intellectual property right associated with an (authenticated) digital IP sign comprised in the product. In some embodiments the electronic reading device or a system comprising or cooperating with the electronic reading device may be adapted to present to the human operator a representation of an intellectual property right associated with an (authenticated) digital IP sign comprised in the product.

By providing this information the electronic reading device or a system comprising or cooperating with the electronic reading device may assist the human operator in assessing whether a given product may be a counterfeit or may be infringing some intellectual property right and whether and which further action should be taken, such as for example seizing the product and/or contacting or alerting the owner(s) of the potentially infringed intellectual property rights. More specifically, by providing this information the electronic reading device, or a system comprising or cooperating with the electronic reading device, may alert the human operator to products and characteristics of these products that merit a more detailed inspection and in relation to which (registered) intellectual property rights these products and/or product characteristics merit a more detailed inspection.

Digital IP Signs Embedded in Packaging.

In some cases it may not be feasible or practical to embed electronic IP tags to the actual goods that the customer may be interested in. For example in the case of consumables such as food or pharmaceuticals it may not be possible to embed electronic devices, such as electronic IP tags, into the food or medication that is destined to be ingested by the customer. In that case the electronic IP tags may be embedded or affixed, just like a physical trademark, to the packaging of the goods rather than to the goods themselves. If however the goods themselves are very valuable, then it may be profitable for fraudsters to 'recycle' genuine packages, which may have been discarded when the goods they contain have been removed or consumed, to harvest genuine electronic IP tags and re-use them in falsified packages containing counterfeit goods.

Detecting Package Opening.

To prevent such fraudulent recycling of genuine electronic IP tags, in some embodiments an electronic IP tag may be adapted such that when a package that may embed such an electronic IP tag is opened, for example by a customer to consume the goods contained in the package, the electronic IP tag is irreversibly altered or damaged such that they can no longer be used to provide to an electronic reading device valid digital IP signs that may be successfully authenticated. Such electronic IP tags may be referred to as electronic IP seals elsewhere in this description.

For example, in some embodiments the cap of, for example, an expensive bottle of liquor or perfume, may comprise an embedded electronic IP tag that is adapted and affixed to the cap in such a way that opening the cap of the bottle has the effect of physically destroying the electronic IP tag (or a component connected to the electronic IP tag that is required for the correct functioning of the electronic IP tag), for example, by tearing it apart in an irreparable way. Or, for example, in some embodiments extracting a pill from a blister pack containing pharmaceutical pills may have the effect of physically destroying an electronic IP tag (or a component connected to the electronic IP tag that is required for the correct functioning of the electronic IP tag) embedded in the blister pack.

Since opening a packaging to consume the goods will typically be a mechanical operation by the consumer, in some embodiments an electronic IP tag embedded in or affixed to the packaging may be adapted to be triggered by such a mechanical action to for example self-destruct the electronic IP tag or to destroy information that the electronic IP tag may require to correctly authenticate a digital IP sign comprised in the electronic IP tag to an electronic reading device. In some embodiments, the mechanical operation for opening the package may cause an irreversible loss of information that cannot be retrieved from the debris of the opened package.

In some embodiments an electronic IP seal may comprise an electronic IP tag and a tamper detection component connected to the electronic IP tag, whereby the tamper detection component and the electronic IP tag may be adapted such that a certain mechanical deformation of the tamper detection component may induce a permanent and irreversible state change in the tamper detection component which causes that the electronic IP tag after that state change no longer successfully authenticates itself or its digital IP sign(s). The electronic IP seal may be embedded in or attached to a product package such that opening of the product package inevitably causes the above mentioned mechanical deformation.

For example in some embodiments the electronic IP seal may be embedded in a blister pack and the mechanical stress resulting from opening the blister pack may be used by the tamper detection component of the electronic IP seal using a piezo-electrical effect to induce an erasing voltage that may irreparably erase or damage a secret key embedded in the electronic IP tag.

For example in some embodiments the packaging may comprise a tissue of, for example, electrically conducting wires or optical fibers. In some embodiments the packaging may be adapted so that a mechanical stress associated with opening the packaging may damage or alter certain physical characteristics of this tissue. For example the tissue may be fixed to a bottle and a cap that closes the bottle whereby one part of the tissue may be fixed to the bottle and another part of the tissue may be fixed to the cap such that opening the bottle by removing the cap will inevitably tear the tissue. In some embodiments an electronic IP tag may be connected to the tissue and may be adapted to detect damages or changes in the physical characteristics of the tissue that may be caused by opening the packaging. The tissue thus acts as a tamper detection component and the combination of the tissue and the electronic IP tag thus acts as an electronic IP seal.

For example in some embodiments the tissue may comprise a set of conducting wires that may be connected to gates of a chip comprised in the electronic IP tag. In some embodiments each individual conducting wire may have a specific individual value for its electrical resistance (whereby in some embodiments some of the wires may even be interrupted) and the tissue comprising the wires may be adapted such that the electrical resistance of at least some of the wires may change upon opening the packaging, for example because the wires may break or may be elongated. In some embodiments the electronic IP tag may be adapted so that it is capable of measuring the value of the electrical resistance of each wire, for example when the electronic IP tag is requested by an electronic reading device to provide a digital IP sign or to authenticate. In some embodiments the electronic IP tag may be configured, e.g. during an initialization stage, with the reference values for the resistances of the wires of the tissue connected to the electronic IP tag and the electronic IP tag may be adapted to measure the resistances of the wires e.g. when the electronic IP tag is requested by an electronic reading device to provide a digital IP sign or to authenticate. The electronic IP tag may be further adapted to compare the measurements of the resistances with the configured reference values and the electronic IP tag may be adapted to conclude that the packaging has been opened if, for example, the difference between the measurements and the reference values exceeds a certain threshold.

For example in some embodiments the tissue may comprise a set of optical fibers that may be connected to optical gates of for example a chip comprised in the electronic IP tag. In some embodiments a part of the optical fibers may be interrupted so that they don't transmit light. In some embodiments which fibers are interrupted and which not may be according to a random pattern that may be different for each individual electronic IP tag. In some embodiments the electronic IP tag may be configured, e.g. during an initialization stage, with data, such as a reference pattern, indicating which fibers are interrupted and which are not. In some embodiments the electronic IP tag may be adapted to measure, e.g. when the electronic IP tag is requested by an electronic reading device to provide a digital IP sign or to authenticate, which wires are interrupted and which are not. For example in some embodiments the electronic IP tag may be adapted to attempt to transmit light through the wires and to detect for each fiber whether the fiber transmits the light or not. The electronic IP tag may be further adapted to compare the measured pattern of non-transmitting fibers with the configured reference pattern and the electronic IP tag may be adapted to conclude that the packaging has been opened if, for example, the measured pattern doesn't match the reference pattern. In some embodiments the configured interruptions of the fibers may be located on a specific location of the tissue. In some embodiments the tissue may be adapted such that the optical fibers comprised in the tissue will preferably break at the location of the configured interruptions when the packaging is opened. This may make it more difficult for a fraudulent party to analyse the damaged tissue and reconstruct the original pattern.

In some embodiments, if the electronic IP tag has detected that the packaging has been opened, it may for example enter into an expiry state in which it, for example, no longer makes available the digital IP sign or no longer validly authenticates towards an electronic reading device.

In some embodiments a package comprising an electronic tag that effectively may self-destruct upon opening of the package may also be used as an electronic seal to electronically detect whether the package may have been opened, for example, to tamper with the contents of the package.

Multi-Certified IP Tags.

Protection and registration of intellectual property such as trademarks and designs are a territorial matter. That means that to enjoy adequate legal protection the same trademark or design may have to be registered with the trademark or design offices of the various territories in which the trademark or design, or goods with that trademark or design, may be used.

In some embodiments a digital IP sign may therefore be certified by multiple certificate authorities that may, for example, correspond to the multiple trademark or design registration offices of various territories.

In some embodiments there may be an overarching worldwide or multi-territory authority that is capable of delivering certifications that may be valid for a number of associated trademark offices and their associated territories. In such embodiments a single digital IP certificate may contain the information that points to the various registrations of the various trademark and design offices.

In some embodiments a single digital IP sign could have multiple certificates and the reader may be adapted to obtain the relevant certificate (e.g. by reading them all and selecting the correct one, or by indicating to the tag which certificate is of interest to the reader).

Additional Information.

The digital IP sign may also be used to convey other information related to the goods such as for example the expiry date of the goods, or the production date of the goods, or a serial number.

In some embodiments, the digital IP sign may also comprise information that may indicate during which time period the goods comprising the digital IP sign may legitimately be transported or imported. In some embodiments the system may be adapted to flag a product as counterfeit suspicious, if it is presented at Customs for inspection at a time that falls outside the time period indicated by the digital IP sign that the goods may legitimately be transported or imported. This mechanism provides an extra barrier against recycling for counterfeit goods genuine electronic IP tags that have been extracted from consumed genuine goods or packages.

One aspect of the invention provides an apparatus for indicating the legitimate use of a feature or characteristic of a physical product covered by an intellectual property right. In a first set of embodiments the apparatus may comprise an electronic IP tag, the electronic IP tag comprising a wireless data communication interface, a memory for storing data, and a data processor, whereby: the memory may be adapted to store digital IP sign data associated with an intellectual property right and comprising an identifier of said intellectual property right; the memory may be further adapted to store a private key of a public-private key pair associated to said intellectual property right; the data processor may be further adapted to perform an asymmetric cryptographic algorithm for authenticating said digital IP sign data or said electronic IP tag to an electronic reading device, said cryptographic algorithm parameterized with said private key; the electronic IP tag may be adapted to communicate with said electronic reading device using said wireless data communication interface for sending said digital IP sign data to said electronic reading device and for said authenticating said digital IP sign data or said electronic IP tag to said electronic reading device.

In some embodiments the apparatus may comprise any of the apparatus of the preceding set of embodiments wherein the electronic IP tag is further adapted to receive using said wireless data communication interface a challenge from said electronic reading device, to generate a response to said challenge by said data processor performing said asymmetric cryptographic algorithm using said challenge as an input for said asymmetric cryptographic algorithm, and to return said response to said electronic reading device using said wireless data communication interface.

In some embodiments the apparatus may comprise any of the apparatus of any of the preceding sets of embodiments wherein said generated response to said challenge may comprise an electronic signature generated by said data processor a digital signature algorithm based on said asymmetric cryptographic algorithm parameterized with said private key.

In some embodiments the apparatus may comprise any of the apparatus of any of the preceding sets of embodiments wherein said digital IP sign data further comprises a public key related data element for the electronic reading device to retrieve a public key of said public-private key pair. In some embodiments said public key related data element may comprise said public key.

In some embodiments the apparatus may comprise any of the apparatus of any of the preceding sets of embodiments wherein said digital IP sign data further comprises a certificate related data element for the electronic reading device to retrieve a public key certificate certifying said public key and linking said public key to at least part of said digital IP sign data. In some embodiments said public key related data element may comprise said public key. In some embodiments said certificate may link said public key to said identifier of said intellectual property right.

In some embodiments the apparatus may comprise any of the apparatus of any of the preceding sets of embodiments wherein the apparatus further comprises an electronic IP seal wherein the electronic IP seal comprises the electronic IP tag and further comprises a tamper detection component, the tamper detection component connected to the electronic IP tag. In some embodiments the tamper detection component may support a tampered state and a non-tampered state and the electronic IP tag and the tamper detection component may be adapted such that if the tamper detection component is in said tampered state then said authenticating of said digital IP sign data or said electronic IP tag cannot be done successfully. In some embodiments the tamper detection component may have an initial state and the electronic IP tag and the tamper detection component may be adapted such that if the tamper detection component is no longer in that initial state then said authenticating of said digital IP sign data or said electronic IP tag cannot be done successfully. In some embodiments the tamper detection component may be adapted to change its state from a non-tampered state to a tampered state or to change its state from an initial state into another state in response to some physical deformation of an object that the tamper detection component is embedded in.

In some embodiment the object that the tamper detection is embedded in may be a product packaging and the physical deformation in response to which the tamper detection component may change its state may be an opening of the product packaging. I.e. in some embodiments the tamper detection component may be embedded in a product packaging and the tamper detection component may be adapted to be initially in an initial state, such as a non-tampered state, and to go to another state, such as a tampered state, upon the product packaging being opened. In some embodiments the tamper detection component may be adapted such that a change of its state in response to a physical deformation may be irreversible.

In some embodiments a state of the tamper detection component, such as the non-tampered state or initial state mentioned above, may encode a specific value of a tamper data element and the electronic IP tag may be adapted to determine the value of the tamper data element encoded in the state of the tamper detection component. For example in some embodiments the state of the tamper detection component may be one of a range or a set of different physical states and the electronic IP tag may be adapted to measure that physical state, whereby the measurement of said physical state may correspond to the above mentioned tamper data element. In some embodiments the electronic IP tag may be adapted such that if the specific value of the tamper data element encoded in the state of the tamper detection component, such as the measured value of the physical state, doesn't correspond to a specific pre-determined value then said authenticating of said digital IP sign data or said electronic IP tag cannot be done successfully.

For example in some embodiments the electronic IP tag may be adapted to store this specific pre-determined value as a reference value and it may further be adapted to compare this reference value to the determined value of the tamper data element which is encoded in the state of the tamper detection component (such as the measurement by the electronic IP tag of the physical state of the tamper detection component). The electronic IP tag may be adapted to refrain from correctly authenticating itself and/or the digital IP sign data if the comparison indicates that the determined value of the tamper data element encoded in the tamper detection component doesn't match the stored reference value.

For example in other embodiments the electronic IP tag may be adapted to use the determined value of the tamper data element when performing said authenticating of said digital IP sign data or said electronic IP tag. In some embodiments said determined value of the tamper data element may be a parameter of a cryptographic algorithm that is used by the electronic IP tag in said authenticating of said digital IP sign data or said electronic IP tag whereby the cryptographic algorithm may be such that if the determined value of the tamper data element doesn't correspond to a specific pre-determined value then the cryptographic algorithm will produce a wrong result and said authenticating will fail. In some embodiments the electronic IP tag may be adapted to use the determined value of the tamper data element to reconstruct or determine a value of a cryptographic authentication key that the electronic IP tag may use in a cryptographic authentication algorithm for authenticating the electronic IP tag or its digital IP sign data. For example in some embodiments the electronic IP tag may store an encrypted cryptographic authentication key, such as private key of a public-private key pair, that is encrypted with the specific pre-determined value and to perform said authentication said electronic IP tag may use the determined value of the tamper data element to decrypt the encrypted authentication key and use the resulting decrypted value in an authentication algorithm, for example as a private key for generating an electronic signature over a challenge using an electronic signature algorithm that is parameterized by said private key. If the determined value of the tamper data element doesn't correspond to the specific pre-determined value then the decryption will result in a wrong value of the decrypted authentication key and the authentication algorithm parameterized with that wrong value of the authentication key will fail.

In some embodiments any of the previously described apparatus comprising an electronic IP tag or an electronic IP seal may be comprised in physical goods or a physical product, the physical goods or the physical product comprising or having a visible feature or characteristic corresponding to said intellectual property right. In some embodiments any of the previously described apparatus comprising an electronic IP tag or an electronic IP seal may be comprised in physical goods or a physical product, the physical goods or the physical product being marked with a visual trademark corresponding to said intellectual property right.

Methods for Initializing Electronic IP Tags or Electronic IP Seals.

Another aspect of the invention provides a method for initializing a particular electronic IP tag of a plurality of electronic IP tags.

In some embodiments the initialization method may comprise the following steps: associating the particular electronic IP tag with an intellectual property right; generating a tag public-private key pair that is specific for said particular electronic IP tag; storing the tag private key of said tag public-private key pair in said particular electronic IP tag; generating digital IP sign data and storing said digital IP sign data in said particular electronic IP tag whereby the digital IP sign data comprise an intellectual property right identifying data element for identifying the intellectual property right that the particular electronic IP tag is associated with; and generating a cryptographically verifiable link between said tag private key and said digital IP sign data. In some embodiments one or more steps of the initialization method may be done by an initialization station. In some embodiments one or more steps of the initialization method may be done by the electronic IP tag itself.

In some embodiments the step of generating a tag public-private key pair that is specific for said particular electronic IP tag may be done by the particular electronic IP tag itself and the initialization method may further comprise reading from the electronic IP tag the tag public key of the tag public-private key pair generated by the electronic IP tag. In other embodiments the step of generating a tag public-private key pair that is specific for said particular electronic IP tag may be done by another key pair generating device than the particular electronic IP tag, such as for example an initialization station, and the key pair generating device may communicate the tag private key of the generated tag public-private key pair to the electronic IP tag to be stored in the electronic IP tag.

In some embodiments the step of generating a cryptographically verifiable link between the tag private key and the digital IP sign data may comprise generating a tag certificate, which may be a PKI certificate, for the tag public key corresponding to the tag private key (i.e. the tag public key that belongs to the same tag public-private key pair that the tag private key stored in the electronic IP tag also belongs to). In some embodiments this tag certificate of the tag public key may comprise the intellectual property right identifying data element, thus cryptographically linking the intellectual property right identifying data element to the tag public key and the corresponding tag private key. In some embodiments the tag certificate may be part of the digital IP sign data stored in the electronic IP tag. In some embodiments the tag certificate may be part of a tag certificate chain and a higher public key that is higher up in the tag certificate chain than the tag public key may be linked to the intellectual property right associated to the electronic IP tag. In some embodiments the tag certificate may be part of a tag certificate chain and a higher certificate that is higher up in the tag certificate chain than the tag public key may comprise a second intellectual property right identifying data element for identifying the intellectual property right that the particular electronic IP tag is associated with. In some embodiments the tag certificate chain may, in part or in its entirety, be stored in the electronic IP tag.

In some embodiments of the initialization method the particular electronic IP tag may be comprised in an electronic IP seal and may be connected to a tamper detection component also comprised in this electronic IP seal. In some embodiments the initialization method may further comprise initializing an initial state of the tamper detection component and configuring a data element stored in the particular electronic IP tag to match this initial state. In some embodiments initializing the initial state of the tamper detection component may comprise initializing the initial state of the tamper detection component that is unique for that particular tamper detection component connected to the particular electronic IP tag. The terminology unique may in this context refer to absolute uniqueness (i.e. it is guaranteed that the same the initial state will only occur at most in one tamper detection component) or may refer to statistical or probabilistic uniqueness (i.e. knowledge about the initial state for one particular tamper detection component doesn't provide any knowledge about the initial states of any other tamper detection components; in other words it may not in principle be excluded that two tamper detection component may end up with the same initial state but if that happens then this is not predictable and would seem to be the result of coincidence at least from the point of view of an outside party). In some embodiments initializing the initial state of the tamper detection component may comprise initializing the initial state of the tamper detection component to a specific pre-defined state. In some embodiments initializing the initial state of the tamper detection component may comprise initializing the initial state of the tamper detection component to some random state and measuring the initial state. In some embodiments configuring a data element stored in the particular electronic IP tag to match this initial state may comprise storing a reference value in the electronic IP tag for the electronic IP tag to compare at a later stage, e.g. when requested to authenticate itself, with a measurement of a current state of the tamper detection component whereby this measurement is obtained by the electronic IP tag. In some embodiments configuring a data element stored in the particular electronic IP tag to match this initial state may comprise obtaining an initial measurement of the initial state of the tamper detection component and storing the obtained initial measurement as a reference value in the electronic IP tag for the electronic IP tag to compare at a later stage with a measurement of a current state of the tamper detection component. In some embodiments also the initial measurement may be obtained by the electronic IP tag. In some embodiments configuring a data element stored in the particular electronic IP tag to match this initial state may comprise storing in the electronic IP tag a data element for the electronic IP tag to combine at a later stage, e.g. when requested to authenticate itself, with a measurement of a current state of the tamper detection component in order to obtain a data element, such as a cryptographic secret, that the electronic IP tag may require to successfully authenticate itself.

In some embodiments of the initialization method the plurality of electronic IP tags may comprise any of the electronic IP tags or electronic IP seals described in more detail elsewhere in this description.

Methods for Manufacturing Goods.

Yet another aspect of the invention provides a method for manufacturing a physical product.

In some embodiments the manufacturing method may comprise the following steps: applying a visual mark to the product that corresponds to a registered intellectual property right; embedding in or attaching to the product an electronic IP tag that is associated with this registered intellectual property right. In some embodiments the electronic IP tag may comprise any of the electronic IP tags described in more detail elsewhere in this description. In some embodiments the method may comprise embedding in or attaching to the product an electronic IP seal comprising the electronic IP tag and a tamper detection component connected to the electronic IP tag. In some embodiments the product may comprise a packaging component and embedding or attaching the electronic IP seal in or to the product may comprise embedding or attaching the electronic IP seal in or to the packaging component in such a way that opening the packaging component causes the electronic IP tag to function incorrectly or to no longer authenticate itself or its digital IP sign data properly as is described in more detail elsewhere in this description. In some embodiments the electronic IP seal may comprise any of the electronic IP seals described in more detail elsewhere in this description. In some embodiments the method may further comprise any of the steps of any of the initialization methods to initialize one or more electronic IP tags or electronic IP seals as described in more detail elsewhere in this description.

Electronic Reading Device.

Yet another aspect of the invention provides an electronic reading device for reading an IP tag.

In some embodiments the electronic reading device may comprise: a wireless data communication interface adapted to wirelessly exchange data with an electronic IP tag comprised in a physical product; a data processing component adapted to perform an authentication protocol for authenticating said electronic IP tag; a feature capturing component for capturing one or more physical features of the physical product that comprises said electronic IP tag.

In some embodiments said physical feature may comprise a visible feature and said feature capturing component may comprise a digital camera. In some embodiments said electronic reading device or said data processing component may be adapted to extract said physical feature from an image captured with said digital camera. In some embodiments the electronic reading device or the data processing component may be adapted to extract said physical feature from an image captured with said digital camera by applying an optical character recognition algorithm to said image.

In some embodiments the electronic reading device may comprise any of the electronic reading devices of the previously described embodiments wherein the wireless data communication interface may be further adapted to receive from the electronic IP tag a digital signature generated by the electronic IP tag and wherein the data processing component may be further adapted to perform said authentication protocol by verifying said received digital signature. In some embodiments the data processing component may be further adapted to verify said received digital signature by applying to said received digital signature a digital signature verification algorithm that may be based on asymmetric cryptography and using a tag public key associated with the electronic IP tag. In some embodiments the electronic reading device may be further adapted to obtain said tag public key by using the wireless data communication interface to receive the tag public key from the electronic IP tag. In some embodiments performing said authentication protocol may further comprise verifying a tag certificate and/or a tag certificate chain of said tag public key. In some embodiments the electronic reading device may be further adapted to obtain said tag certificate and/or said tag certificate chain by using the wireless data communication interface to receive the tag certificate and/or the tag certificate chain from the electronic IP tag.

Reading Digital IP Sign Data.

In some embodiments the electronic reading device may be further adapted to use the wireless data communication interface to receive digital IP sign data from the electronic IP tag. In some embodiments the digital IP sign data may comprise an intellectual property right identification data element and the electronic reading device may be adapted to identify an intellectual property right associated with the electronic IP tag by using said received intellectual property right identification data element.

Human Input Interface.

In some embodiments the electronic reading device may further comprise a human input interface adapted to receive inputs from a user of the electronic reading device and the electronic reading device may be further adapted to use said human input interface to receive from said user assistance in capturing said one or more physical features of said product. In some embodiments the human input interface may be adapted to receive textual inputs and the electronic reading device may be further adapted to use said human input interface to receive from said user texts or words that may be visible on the product.

Human Output Interface.

In some embodiments the electronic reading device may further comprise a human output interface adapted to present information to a user of the electronic reading device. In some embodiments the electronic reading device may be adapted to obtain a reference representation of an intellectual property right associated with the electronic IP tag and to present said reference representation to the user using said human output interface. In some embodiments said obtaining a reference representation of an intellectual property right associated with the electronic IP tag and/or presenting said reference representation to the user using said human output interface may be conditional on said authenticating said electronic IP tag having been performed successfully. In some embodiments the electronic reading device may be adapted to obtain an estimate of the likelihood that the physical product is infringing some intellectual property right and may be adapted to communicate this estimate to the user by using said human output interface. In some embodiments the electronic reading device may be adapted to obtain an estimate of the likelihood that the physical product is infringing a particular intellectual property right and to obtain a representation of that particular intellectual property right and may be adapted to communicate this estimate and present this representation to the user by using said human output interface. In some embodiments the electronic reading device may be adapted to obtain an estimate of the likelihood that a particular captured feature or characteristic of the physical product is infringing a particular intellectual property right and to obtain a representation of that particular intellectual property right and may be adapted to use said human output interface to communicate this estimate and present this representation and a representation of that particular captured feature or characteristic to the user of the electronic reading device.

Second Data Communication Interface.

In some embodiments the electronic reading device may further comprise a second data communication interface adapted to exchange data with one or more computing devices other than the electronic reading device. This second data communication interface may for example comprise an internet connection of a Bluetooth connection or a WIFI connection.

In some embodiments the electronic reading device may comprise any of the electronic reading devices described elsewhere in this description.

BRIEF DESCRIPTION OF THE DRAWINGS

The foregoing and other features and advantages of the described embodiments will be apparent from the following, more particular description of embodiments of aspects of the invention, as illustrated in the accompanying drawings.

DETAILED DESCRIPTION

Some implementations of the described embodiments are discussed below. While specific implementations are discussed, it should be understood that this is done for illustration purposes only. A person skilled in the relevant art will recognize that other components and configurations may be used without parting from the spirit and scope of the invention.

Figure 1:
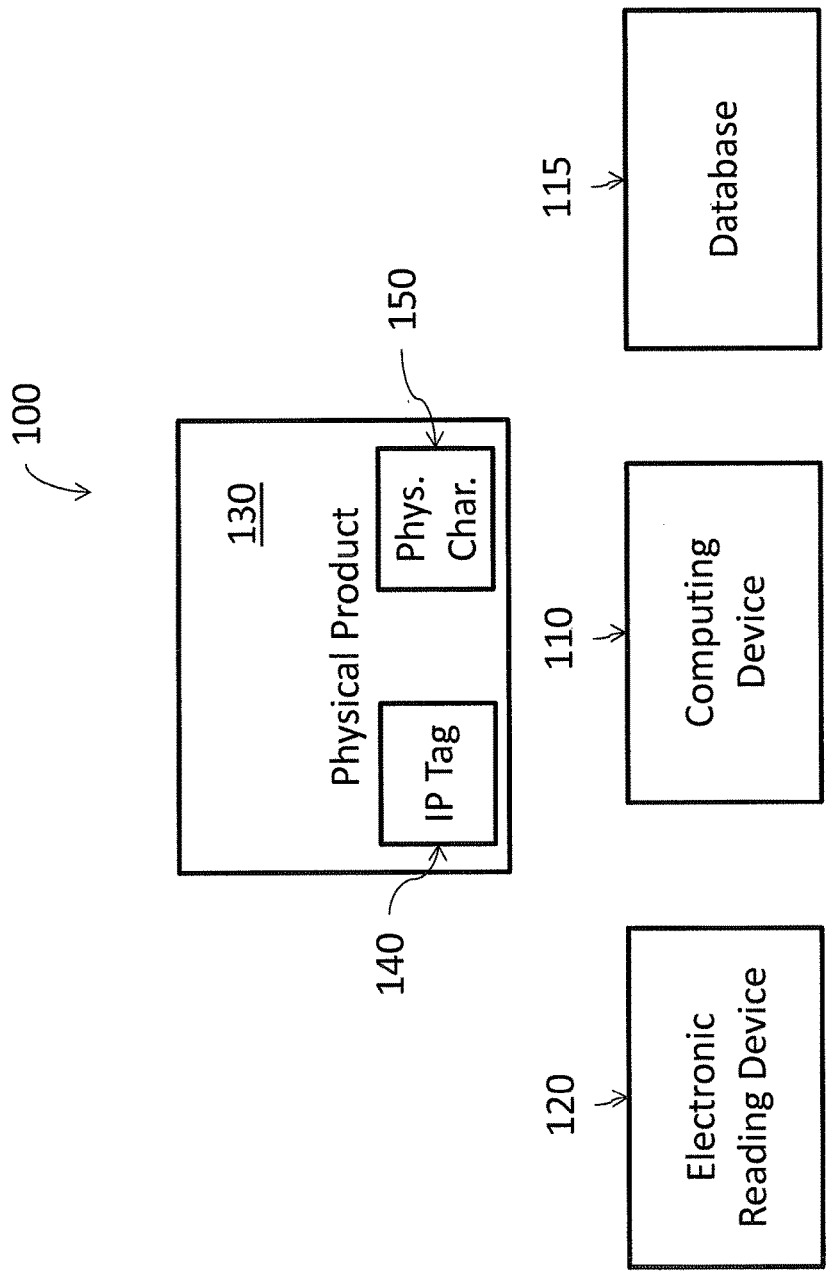
FIG. 1 schematically illustrates an exemplary system according to an aspect of the invention.

FIG. 1 schematically illustrates an exemplary system (100) according to an aspect of the invention. In some embodiments the system may be used with any of the methods and/or apparatus described elsewhere in this description. In some embodiments the system may comprise a system for identifying potentially counterfeited products as has been described in more detail elsewhere in this description.

In some embodiments the system may comprise a physical product (130), which in turn may comprise an electronic IP tag (140), such as for example one of the electronic IP tags described elsewhere in this description, and a physical characteristic (150) such as a visual sign that may comprise a visual trademark or logo, for example. The system may further comprise an electronic reading device (120), such as for example one of the electronic reading devices described elsewhere in this description. The system may further comprise a computing device (110), such as a server, which may comprise or be connected to a database (115) such as a database of registered trademarks or designs or other IP or a database of reference representations of for example registered trademarks or designs or other IP.

Figure 2:
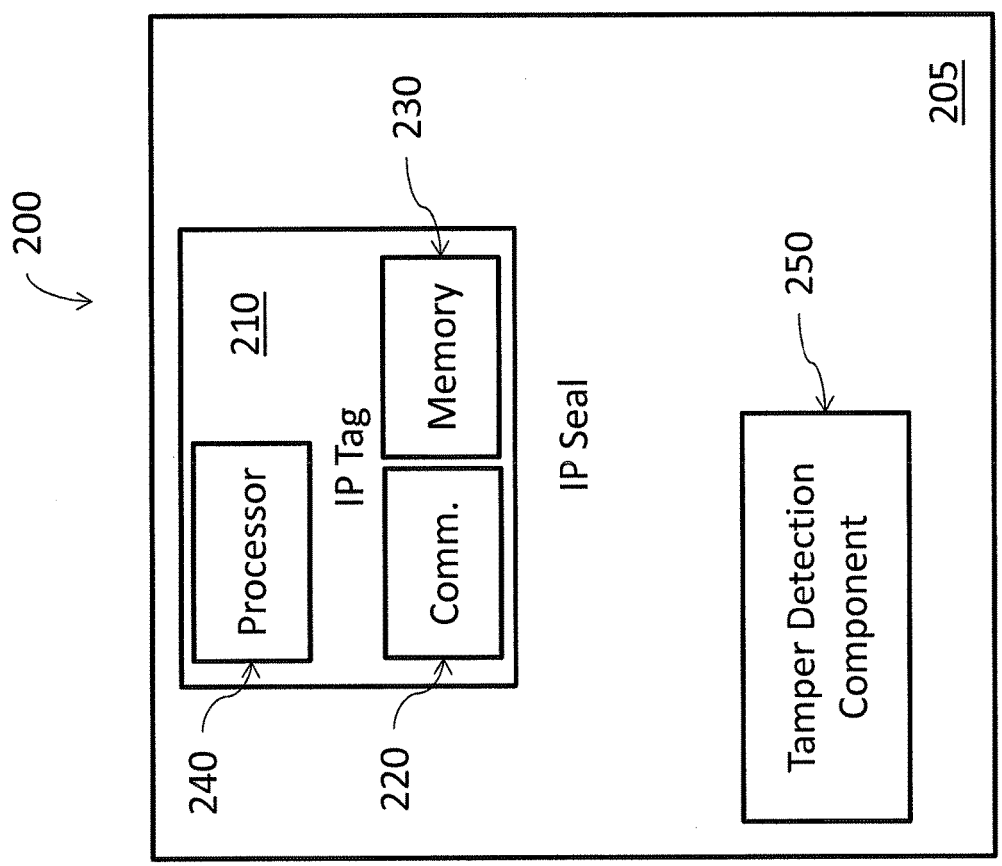
FIG. 2 schematically illustrates an exemplary apparatus according to an aspect of the invention.

FIG. 2 schematically illustrates an exemplary apparatus (200) for indicating the legitimate use of a feature of a physical product covered by an intellectual property right. In some embodiments the apparatus may comprise an electronic IP tag (210). The electronic IP tag (210) may comprise a wireless data communication interface (220), a memory (230) for storing data, and a data processor (240). The electronic IP tag may comprise any of the electronic IP tags described in more detail elsewhere in this description.

The memory may be adapted to store digital IP sign data that may be associated with the intellectual property right and that may comprise an identifier of said intellectual property right. The electronic IP tag may be adapted to communicate with the electronic reading device using the wireless data communication interface for sending the digital IP sign data to the electronic reading device and for exchanging data with the electronic reading device for authenticating the digital IP sign data or the electronic IP tag to an electronic reading device. The memory may be further adapted to store a private key of a public-private key pair associated to the intellectual property right. The data processor may be adapted to perform an asymmetric cryptographic algorithm parameterized with the private key for said authenticating the digital IP sign data or the electronic IP tag to an electronic reading device. The data processor may be connected to the memory and the wireless data communication interface.

The apparatus may further comprise an electronic IP seal (205) wherein the electronic IP seal may comprise the electronic IP tag (210) and may further comprise a tamper detection component (250) that may be connected to the electronic IP tag. The tamper detection component may have a physical state. The tamper detection component may be adapted to irreversibly change its state from an initial state into another state in response to some physical deformation of an object that the tamper detection component is embedded in, and the electronic IP tag and the tamper detection component are adapted such that if the tamper detection component is no longer in that initial state then said authenticating of the digital IP sign data or the electronic IP tag cannot be done successfully. The electronic IP seal may comprise any of the electronic IP seals described in more detail elsewhere in this description.

Figure 3:
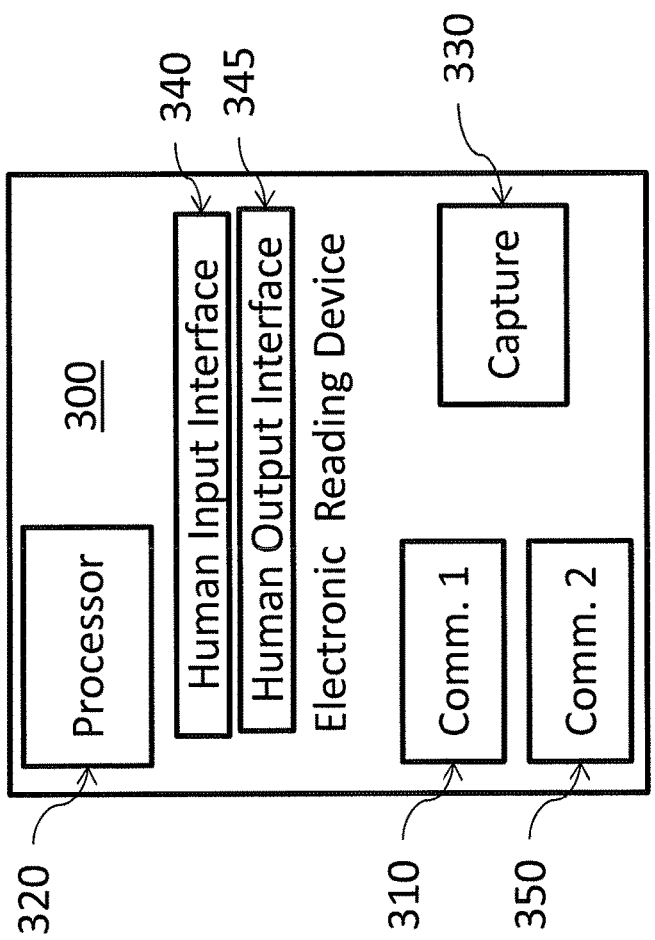
FIG. 3 schematically illustrates another exemplary apparatus according to an aspect of the invention.

FIG. 3 schematically illustrates an electronic reading device (300) for reading an electronic IP tag or electronic IP seal. In some embodiments the electronic IP tag or electronic IP seal may comprise any of the electronic IP tags or electronic IP seals described in more detail elsewhere in this description. In some embodiments the electronic reading device may comprise any of the electronic reading devices described in more detail elsewhere in this description. In some embodiments the electronic reading device (300) may comprise for example a tablet computer or a smartphone.

In some embodiments the electronic reading device (300) may comprise a wireless data communication interface (310) adapted to wirelessly exchange data with an electronic IP tag comprised in a physical product and associated with an intellectual property right, a data processing component (320) adapted to perform an authentication protocol for authenticating the electronic IP tag, and a feature capturing component (330) for capturing one or more physical features of the physical product that comprises said electronic IP tag.

The electronic reading device may further comprise a human input interface (340) adapted to receive inputs from a user of the electronic reading device, and the electronic reading device may be further adapted to use said human input interface to receive from said user assistance in capturing said one or more physical features of said product.

The electronic reading device may further comprise a second data communication interface (350) adapted to exchange data with one or more computing devices other than the electronic reading device.

The electronic reading device may further comprise a human output interface (345) adapted to present information to a user of the electronic reading device. This information may include a reference representation of an intellectual property right associated with the electronic IP tag which the electronic reading device may have obtained using the second data communication interface or which the electronic reading device may have obtained from the electronic IP tag using the wireless data communication interface. This information may also include an estimate of the likelihood that the physical product is infringing some intellectual property right whereby the electronic reading device may be adapted to obtain this estimate by using the second data communication interface. This information may also include an estimate of the likelihood that the physical product is infringing a particular intellectual property right and a representation of that particular intellectual property right whereby the electronic reading device may be adapted to obtain this estimate and/or this representation by using the second data communication interface.

This information may also include an estimate of the likelihood that a particular captured feature or characteristic of the physical product is infringing a particular intellectual property right, a representation of that particular intellectual property right and a representation of that particular captured feature or characteristic to the user of the electronic reading device, whereby the electronic reading device may be adapted to obtain this estimate and/or this representation of that particular intellectual property right by using the second data communication interface.

Figure 4:
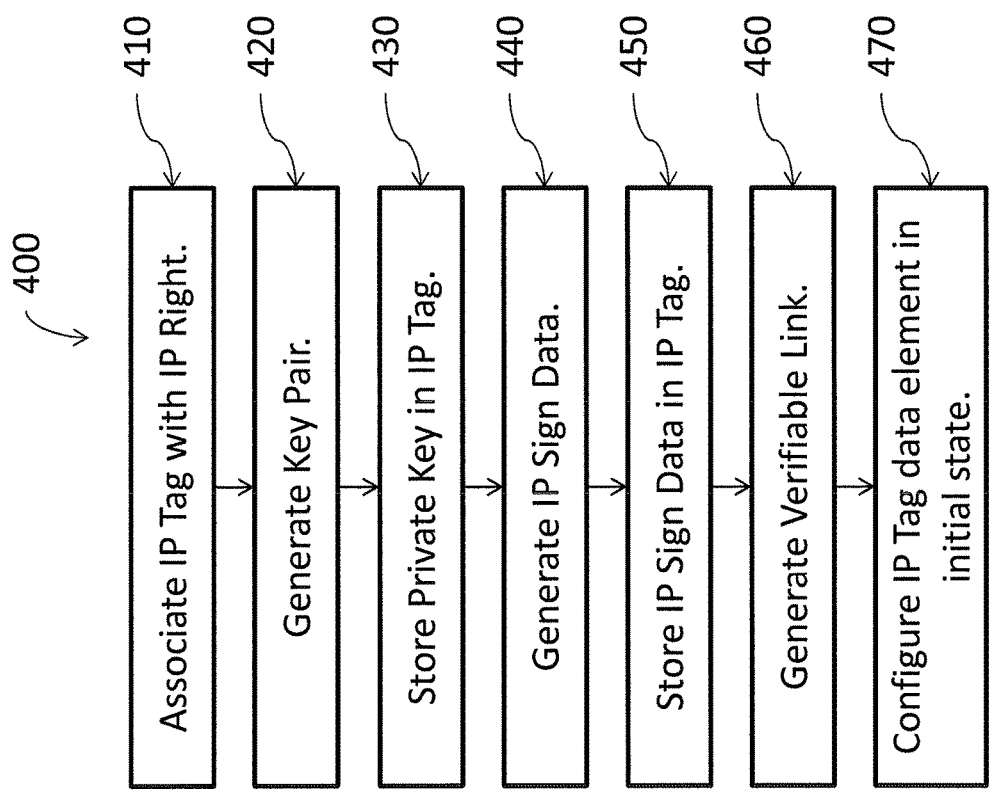
FIG. 4 schematically illustrates an initialization method according to an aspect of the invention.

FIG. 4 schematically illustrates an initialization method (400) for initializing a particular electronic IP tag of a plurality of electronic IP tags. In some embodiments the electronic IP tags may comprise any of the electronic IP tags or electronic IP seals described in more detail elsewhere in this description. In some embodiments the initialization method (400) may comprise any of the initialization methods described in more detail elsewhere in this description.

In some embodiments this initialization method (400) may comprise the steps of: associating (410) the particular electronic IP tag with an intellectual property right; generating (420) a tag public-private key pair that is specific for said particular electronic IP tag; storing (430) a tag private key of said tag public-private key pair in said particular electronic IP tag; generating (440) digital IP sign data and storing (450) said digital IP sign data in said particular electronic IP tag whereby the digital IP sign data comprise an intellectual property right identifying data element for identifying the intellectual property right that the particular electronic IP tag is associated with; and generating (460) a cryptographically verifiable link between said tag private key and said digital IP sign data.

In some embodiments the particular electronic IP tag may be comprised in an electronic IP seal and the electronic IP tag may be connected to a tamper detection component that may also be comprised in this electronic IP seal, and the initialization method may further comprise (470) configuring a data element stored in the particular electronic IP tag to match an initial state of the tamper detection component.

Figure 5:
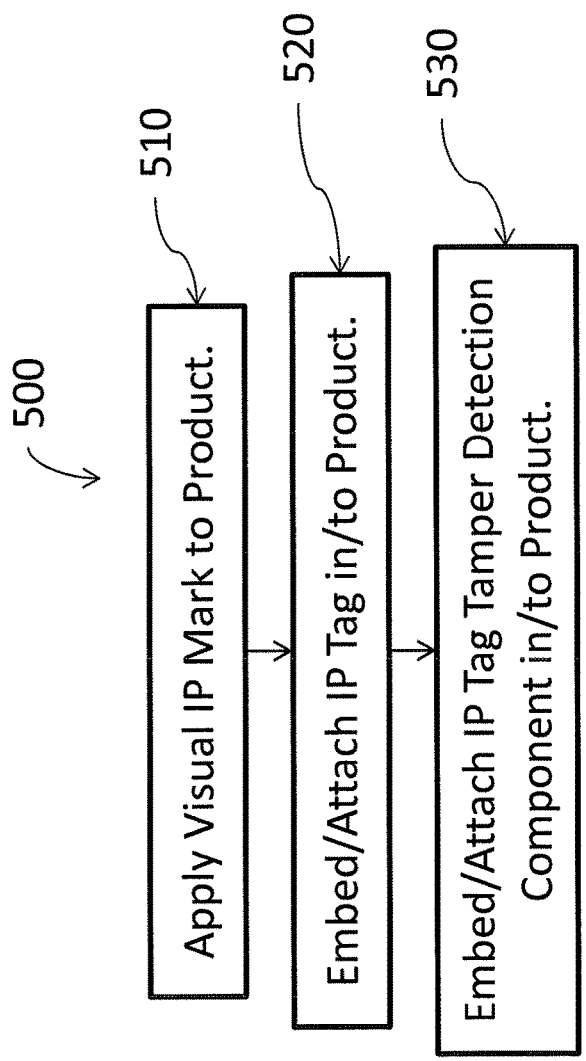
FIG. 5 schematically illustrates a manufacturing method according to an aspect of the invention.

FIG. 5 schematically illustrates a manufacturing method (500), according to an aspect of the invention, for manufacturing a physical product.

In some embodiments the manufacturing method (500) may comprise the steps of: applying (510) to the physical product a visual mark that corresponds to a registered intellectual property right; and embedding (520) in or attaching to the physical product an electronic IP tag that may be associated with this registered intellectual property right. The electronic IP tag may comprise a wireless data communication interface, a memory for storing data, and a data processor. The memory may be adapted to store digital IP sign data that may be associated with said intellectual property right and that may comprise an identifier of said intellectual property right. The electronic IP tag may be adapted to communicate with an electronic reading device using said wireless data communication interface for sending said digital IP sign data to said electronic reading device and for exchanging data with said electronic reading device for authenticating said digital IP sign data or said electronic IP tag to an electronic reading device. The memory may be further adapted to store a private key of a public-private key pair that may be associated to said intellectual property right. The data processor may be adapted to perform an asymmetric cryptographic algorithm parameterized with said private key for said authenticating said digital IP sign data or said electronic IP tag to an electronic reading device.

In some embodiments the manufacturing method may further comprise embedding (530) in or attaching to the physical product a tamper detection component connected to the electronic IP tag, whereby the tamper detection component and the electronic IP tag may be comprised in an electronic IP seal. The tamper detection component may have a physical state, and the tamper detection component may be adapted to irreversibly change this physical state from an initial state into another state in response to some physical deformation of the physical product that the tamper detection component is embedded in, and the electronic IP tag and the tamper detection component may be adapted such that if the tamper detection component is no longer in that initial state then said authenticating of said digital IP sign data or said electronic IP tag cannot be done successfully.

In some embodiments the physical product may comprise a packaging component and embedding or attaching the electronic IP seal in or to the product may comprise embedding or attaching the electronic IP seal in or to the packaging component in such a way that opening the packaging component causes the electronic IP tag to function incorrectly.

In some embodiments the manufacturing method may further comprise any steps of any of the initialization methods for initializing one or more electronic IP tags or electronic IP seals described in more detail elsewhere in this description.

In some embodiments the electronic IP tag or electronic IP seal may comprise any of the electronic IP tags or electronic IP seals described in more detail elsewhere in this description.

Methods for Identifying Products Possibly Infringing an Intellectual Property Right.

Yet another aspect of the invention provides methods for identifying whether a given physical product is possibly infringing some intellectual property right and/or for estimating the likelihood that a given physical product or a physical feature of the given physical product is infringing some intellectual property right.

Figure 6:
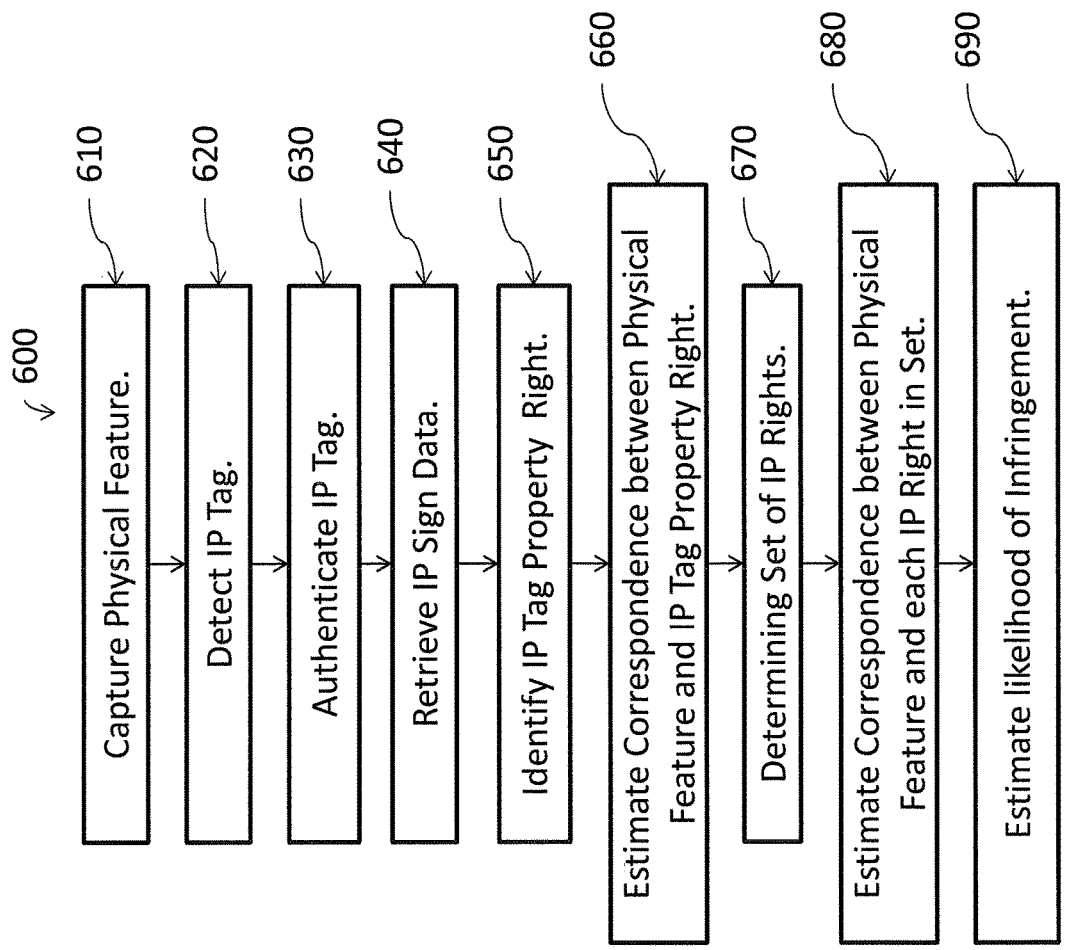
FIG. 6 schematically illustrates an infringement likelihood estimation method according to an aspect of the invention.

FIG. 6 schematically illustrates a method (600) according to an aspect of the invention for estimating the likelihood that a given physical product is infringing some intellectual property right.

In some embodiments a method for estimating the likelihood that a physical feature of a given physical product is infringing some intellectual property right may comprise the following steps: capturing (610) the physical feature/characteristic of the physical product (e.g., a visual IP mark), detecting (620) the presence of an electronic IP tag embedded in the physical product, authenticating (630) the electronic IP tag, retrieving (640) digital IP sign data from the electronic IP tag wherein the digital IP sign data may comprise an intellectual property right identifying data element, using the intellectual property right identifying data element to identify (650) a tag intellectual property right that is associated with the electronic IP tag, estimating or determining (660) a degree of correspondence between the captured physical feature/characteristic of the physical product and the tag intellectual property right that is associated with the electronic IP tag and that has been identified using the intellectual property right identifying data element. Examples of how a degree of correspondence or similarity between a captured physical feature/characteristic of the physical product and an intellectual property right may be assessed or estimated or determined, can be found elsewhere in this description.

In some embodiments the method may further comprise the steps of obtaining a representation of the identified intellectual property right and comparing the obtained representation to the captured physical feature, whereby the outcome of said comparing may be used in said estimating a degree of correspondence between the physical feature and the identified tag intellectual property right.

In some embodiments the method may comprise the steps of determining (670) a set of intellectual property rights, and estimating (680) for each intellectual property right of the determined set a degree of correspondence between the physical feature and that intellectual property right. In some embodiments determining the set of intellectual property rights may comprise retrieving a first set of intellectual property rights, e.g. by accessing a database, and removing members from this first set. For example in some embodiments the identified tag intellectual property right associated with the intellectual property tag may be removed from the first set. In some embodiments removing the identified tag intellectual property right from the first set may be done on condition that said authenticating the electronic IP tag was successful. In some embodiments estimating for each intellectual property right of the determined set a degree of correspondence between the physical feature and that intellectual property right may comprise obtaining for each intellectual property right of the determined set at least one reference IPR (Intellectual Property Right) representation and comparing this obtained at least one reference IPR representation to the physical feature.

In some embodiments performing some steps of the method may be conditional on the outcome of the authentication of the electronic IP tag. For example in some embodiments one or more or all of the steps that involve data that have been obtained directly or indirectly from the electronic IP tag may be performed only if authenticating the electronic IP tag was successful. Such steps may for example include the steps of retrieving from the electronic IP tag digital IP sign data wherein the digital IP sign data may comprise an electronic property right identifying data element, using the electronic property right identifying data element to identify a tag electronic property right associated with the electronic IP tag, estimating a degree of correspondence between the physical feature and the identified tag intellectual property right and any step that may depend on the outcome of these steps.

In some embodiments the method may comprise estimating (690) a feature specific infringement likelihood that the captured physical feature is infringing some intellectual property right. In some embodiments estimating the feature specific infringement likelihood may comprise determining the value of the feature specific infringement likelihood estimate as a function of the outcome of authenticating the electronic IP tag and/or as a function of the estimated degree of correspondence between the physical feature and the identified intellectual property right and/or one or more or all the estimates that have been estimated for the degrees of correspondence between the physical feature and each intellectual property right of the determined set of intellectual property rights. For example in some embodiments the feature specific infringement likelihood estimate may minimally be given a certain high pre-defined value (e.g. more than 80% or 90%) if said authenticating of the electronic IP tag failed.

In some embodiments the physical product may comprise more than one physical feature that may be captured and/or may comprise more than one electronic IP tag and/or an electronic IP tag may be associated with more than one tag intellectual property right, and a method for estimating the likelihood that the given physical product is infringing some intellectual property right may comprise repeating for any combination of any physical feature of the given physical product that may be captured and any tag intellectual property right that may be associated with any intellectual property tag comprised in the physical product a method that may comprise any of the previously described methods for estimating the likelihood that such a physical feature of a given physical product is infringing some intellectual property right.

Other aspects and other steps of these methods may be described in more detail elsewhere in this description. In some embodiments of the methods, the methods may be used with any physical product in which or to which are embedded or attached any of the electronic IP tags or electronic IP seals described in more details elsewhere in this description.

In some embodiments of these methods one or more or all of the steps of the methods may be performed by any of the electronic reading devices described in more details elsewhere in this description. In some embodiments some steps of the methods may be performed by such an electronic reading device and other steps of the methods may be performed by other computing devices connected to the electronic reading device (such as a locally connected Personal Computer and/or a remotely connected server computer). In particular in some embodiments the steps of capturing a physical feature of the physical product and detecting the presence of an electronic IP tag embedded in the physical product may be performed by the electronic reading device while one or more of the other steps of the methods may be performed by such other computing devices.

Systems for Identifying Products Possibly Infringing an Intellectual Property Right.

Yet another aspect of the invention provides systems for identifying whether a given physical product is possibly infringing some intellectual property right and/or for estimating the likelihood that a given physical product or a physical feature of the given physical product is infringing some intellectual property right.

Figure 7:
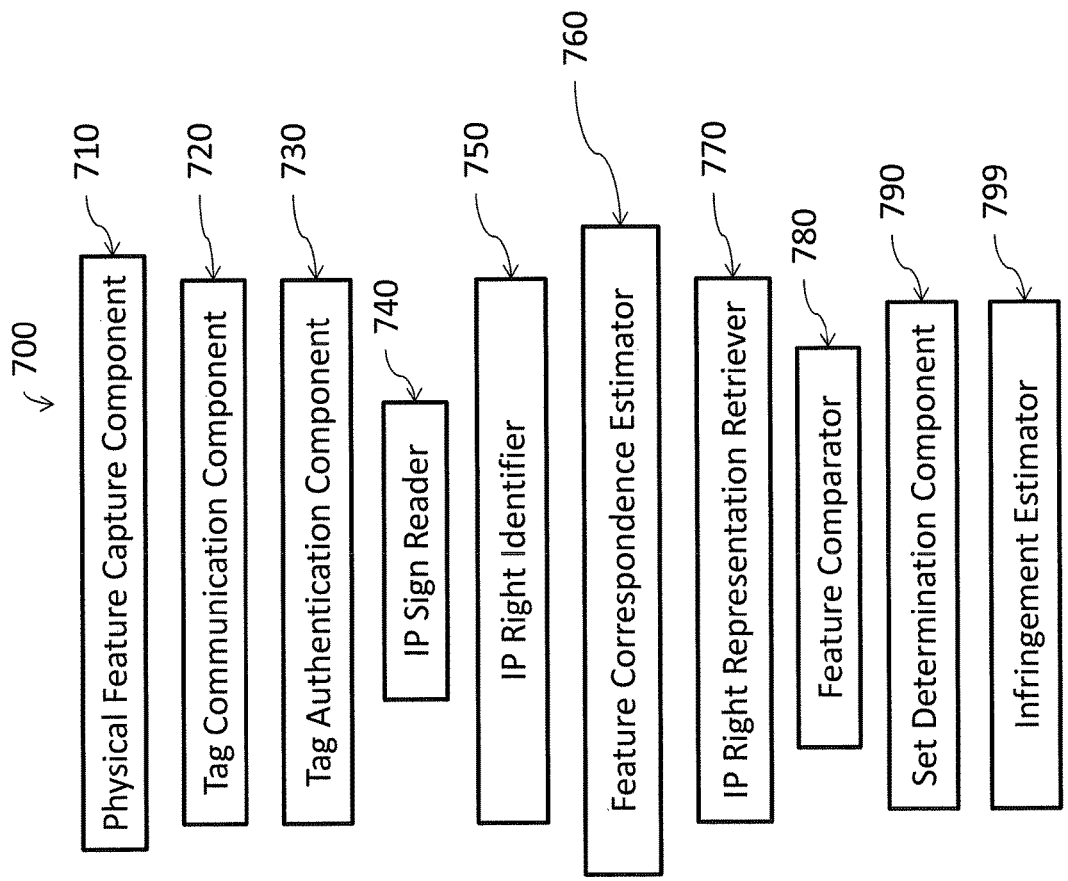
FIG. 7 schematically illustrates an infringement likelihood estimation method according to an aspect of the invention.

FIG. 7 schematically illustrates a system (700) for estimating the likelihood that a given physical product is infringing some intellectual property right.

In some embodiments such a system for estimating the likelihood that a physical feature of a given physical product is infringing some intellectual property right may comprise the following components: a product feature capturing component (710) adapted to capture the physical feature of the physical product, a tag communication component (720) adapted to detect the presence of an electronic IP tag embedded in the physical product and to communicate with the detected electronic IP tag, a tag authentication component (730) adapted to authenticate the electronic IP tag, a digital IP sign reading component (740) to retrieve from the electronic IP tag digital IP sign data wherein the digital IP sign data may comprise an intellectual property right identifying data element, an intellectual property right (IPR) identification component (750) to use the electronic property right identifying data element to identify a tag intellectual property right associated with the electronic IP tag, a feature correspondence estimation component (760) adapted to estimate a degree of correspondence between the physical feature and the identified tag intellectual property right.

In some embodiments the system may further comprise an IPR representation retrieval component (770) adapted to obtain a representation of the identified intellectual property right, and an IPR feature comparison component (780) adapted to compare the obtained representation to the captured physical feature, whereby the feature correspondence estimation component may be further adapted to use the outcome of said comparing for said estimating the degree of correspondence between the physical feature and the identified tag intellectual property right.

In some embodiments the system may comprise an IPR set determination component (790) adapted to determine a set of intellectual property rights, and the feature correspondence estimation component may be further adapted to estimate for each intellectual property right of the determined set a degree of correspondence between the physical feature and that intellectual property right.

In some embodiments the IPR set determination component may be adapted to determine the set of intellectual property rights by retrieving a first set of intellectual property rights, e.g. by accessing a database, and removing members from this first set. For example in some embodiments the identified tag intellectual property right associated with the intellectual property tag may be removed from the first set. In some embodiments removing the identified tag intellectual property right from the first set may be done on condition that said authenticating the electronic IP tag was successful.

In some embodiments the IPR representation retrieval component may be further adapted to obtain for each intellectual property right of the determined set at least one reference IPR (Intellectual Property Right) representation and the IPR feature comparison component may be further adapted to compare this at least one reference IPR representation to the physical feature, and the feature correspondence estimation component may be adapted to estimate for each intellectual property right of the determined set a degree of correspondence between the physical feature and that intellectual property right of the determined set by using the outcome of that comparison between the physical feature and the at least one reference IPR representation obtained for that intellectual property right.

In some embodiments the system may comprise a feature specific infringement likelihood estimation component (799) adapted to estimate a feature specific infringement likelihood i.e. a likelihood that a captured physical feature is infringing some intellectual property right. In some embodiments specific infringement likelihood estimation component may be adapted to estimate the feature specific infringement likelihood by determining the value of the feature specific infringement likelihood estimate as a function of the outcome of authenticating the electronic IP tag and/or as a function of the estimated degree of correspondence between the physical feature and the identified intellectual property right and/or one or more or all the estimates that have been estimated for the degrees of correspondence between the physical feature and each intellectual property right of the determined set of intellectual property rights.

Other aspects and other steps of these systems may be described in more detail elsewhere in this description. In some embodiments the system may be used with any physical product in which or to which are embedded or attached any of the electronic IP tags or electronic IP seals described in more details elsewhere in this description.

In some embodiments the system may comprise any of the electronic reading devices described in more details elsewhere in this description. In some embodiments the system may further comprise other computing devices connected to the electronic reading device (such as a locally connected Personal Computer and/or a remotely connected server computer). In some embodiments one or more or all of the components of the system may be comprised in any of the electronic reading devices described in more details elsewhere in this description. In some embodiments some components of the system may be comprised in such an electronic reading device and other components of the system may be comprised in such other computing devices connected to the electronic reading device. In particular in some embodiments the components of capturing a physical feature of the physical product and detecting the presence of an electronic IP tag embedded in the physical product may be comprised in the electronic reading device while one or more of the other components of the system may be comprised in such other computing devices.

A number of implementations have been described. Nevertheless, it will be understood that various modifications may be made. For example, elements of one or more implementations may be combined, deleted, modified, or supplemented to form further implementations. Accordingly, other implementations are within the scope of the appended claims. In addition, while a particular feature may have been disclosed with respect to only one of several implementations, such feature may be combined with one or more other features of the other implementations as may be desired and advantageous for any given or particular application. With respect to embodiments of the methods, while the various steps have been described in a particular order, it will be apparent for a person skilled in the art that the order of at least some of these steps may be altered. It will also be apparent for a person skilled in the art that some steps may be optional and other steps may be added. While various embodiments have been described above, it should be understood that they have been presented by way of example only, and not limitation. In particular, it is, of course, not possible to describe every conceivable combination of components or methodologies for purposes of describing the claimed subject matter, but one of ordinary skill in the art may recognize that many further combinations and permutations are possible. Thus, the breadth and scope of the teachings herein should not be limited by any of the above described exemplary embodiments but should be defined only in accordance with the following claims and their equivalents.

The invention claimed is:

1. An apparatus for indicating the legitimate use of a feature of a physical product covered by an intellectual property right, the apparatus comprising:
    an electronic intellectual property (IP) tag, the electronic IP tag comprising a wireless data communication interface, a memory for storing data, and a data processor, and
    an electronic IP seal wherein the electronic IP seal comprises the electronic IP tag and further comprises a tamper detection component, the tamper detection component connected to the electronic IP tag, the tamper detection component having a physical state, wherein the tamper detection component is adapted to irreversibly change its state from an initial state into another state in response to physical deformation of an object that the tamper detection component is embedded in, and wherein the electronic IP tag and the tamper detection component are adapted such that if the tamper detection component is no longer in the initial state then said authenticating of said digital IP sign data or said electronic IP tag cannot be done successfully, wherein the physical state of the tamper detection component encodes a specific value of a tamper data element and the electronic IP tag is adapted to determine the value of the tamper data element encoded in the state of the tamper detection component and the electronic IP tag is adapted such that if the specific value of the tamper data element encoded in the state of the tamper detection component doesn't correspond to a specific pre-determined value then said authenticating of said digital IP sign data or said electronic IP tag cannot be done successfully;
    whereby:
        the memory is adapted to store digital IP sign data associated with said intellectual property right and comprising an identifier of said intellectual property right;
        the electronic IP tag is adapted to communicate with an electronic reading device using said wireless data communication interface for sending said digital IP sign data to said electronic reading device and for exchanging data with said electronic reading device for authenticating said digital IP sign data or said electronic IP tag to said electronic reading device;
        the memory is further adapted to store a private key of a public-private key pair associated to said intellectual property right; and
        the data processor is adapted to perform an asymmetric cryptographic algorithm parameterized with said private key for said authenticating said digital IP sign data or said electronic IP tag to said electronic reading device, wherein the electronic IP tag is adapted to use the determined value of the tamper data element to reconstruct or determine a value of said private key.

2. The apparatus of claim 1 wherein the electronic IP tag is further adapted to receive using said wireless data communication interface a challenge from said electronic reading device, to generate a response to said challenge by said data processor performing said asymmetric cryptographic algorithm using said challenge as an input for said asymmetric cryptographic algorithm, and to return said response to said electronic reading device using said wireless data communication interface.

3. The apparatus of claim 2 wherein said generated response to said challenge comprises an electronic signature generated by said data processor a digital signature algorithm based on said asymmetric cryptographic algorithm parameterized with said private key.

4. The apparatus of claim 3 wherein said digital IP sign data further comprises a public key related data element for said electronic reading device to retrieve a public key of said public-private key pair.

5. The apparatus of claim 4 wherein said digital IP sign data further comprises a certificate related data element for said electronic reading device to retrieve a public key certificate certifying said public key and linking said public key to at least part of said digital IP sign data.

6. The apparatus of claim 5 wherein said certificate links said public key to said identifier of said intellectual property right.

7. The apparatus of claim 1 wherein the object that the tamper detection is embedded in is a product packaging and the physical deformation in response to which the tamper detection component changes its state is an opening of the product packaging.

8. The apparatus of claim 1 wherein the electronic IP tag is adapted to store the specific pre-determined value as a reference value and to compare this reference value to the determined value of the tamper data element which is encoded in the physical state of the tamper detection and to refrain from correctly authenticating itself or the digital IP sign data if the comparison indicates that the determined value of the tamper data element doesn't match the stored reference value.

9. The apparatus of claim 1 wherein the electronic IP tag is adapted to use the determined value of the tamper data element when performing said authenticating of said digital IP sign data or said electronic IP tag.

10. The apparatus of claim 1 wherein the electronic IP tag is adapted to store said private key encrypted with the specific pre-determined value, to use the determined value of the tamper data element to decrypt the encrypted authentication key and to use the resulting decrypted value to parameterize said asymmetric cryptographic algorithm for said authenticating said digital IP sign data or said electronic IP tag to said electronic reading device.

11. The apparatus of claim 1 wherein the electronic IP tag is comprised in a physical product comprising a visible feature corresponding to said intellectual property right.

* * * * *